United States Patent
Rouch et al.

(10) Patent No.: US 7,409,663 B2
(45) Date of Patent: Aug. 5, 2008

(54) PROCESS FOR THE PRODUCTION OF AN ELECTRICAL WIRING DIAGRAM

(75) Inventors: Louis Rouch, Toulouse (FR); Laurent Molinari, Villeuneuve Tolosane (FR); André Delpech, Toulouse (FR); Gilles Baudrillard, Puteaux (FR)

(73) Assignees: Airbus France, Toulouse (FR); EADS CCR, Paris (FR)

( * ) Notice: Subject to any disclaimer, the term of this patent is extended or adjusted under 35 U.S.C. 154(b) by 529 days.

(21) Appl. No.: 11/031,011

(22) Filed: Jan. 10, 2005

(65) Prior Publication Data

US 2005/0210434 A1 Sep. 22, 2005

(30) Foreign Application Priority Data

Jan. 9, 2004 (FR) ................................. 04 00168

(51) Int. Cl.
G06F 17/50 (2006.01)
(52) U.S. Cl. .......................................... 716/12; 716/14
(58) Field of Classification Search .............. 716/10–15
See application file for complete search history.

(56) References Cited

U.S. PATENT DOCUMENTS

| | | | |
|---|---|---|---|
| 5,038,294 | A | 8/1991 | Arakawa et al. |
| 6,553,338 | B1* | 4/2003 | Buch et al. ..................... 703/14 |
| 7,013,442 | B2* | 3/2006 | Suaya et al. .................... 716/6 |
| 2003/0208740 | A1* | 11/2003 | Tourne et al. .................. 716/20 |

FOREIGN PATENT DOCUMENTS

GB 1 362 910 8/1974

OTHER PUBLICATIONS

Tsay et al., "Proud: A Sea-of-Gates Placement Algorithm," I.E.E.E. Design & Test of Computers, vol. 5(6), Dec. 1, 1988, pp. 44-56.

* cited by examiner

Primary Examiner—Stacy A Whitmore
Assistant Examiner—Binh C Tat
(74) Attorney, Agent, or Firm—Oblon, Spivak, McClelland, Maier & Neustadt, P.C.

(57) ABSTRACT

This process allows for the automatic production of an electrical wiring diagram on which are located boxes, each representing a component used in an electrical device, connecting lines, each representing an interconnecting cable and connecting terminals corresponding to a possible connection point between a connecting line and a box, the boxes being arranged along an axis of abscissas and an axis of ordinates. The process includes the following steps: input of the components and cables to be represented on the wiring diagram, each component being of a predetermined type; generation and resolution of a first system of equations to optimize the relative positioning of the boxes on the axis of abscissas and their orientation; generation and resolution of a second system of equations to optimize the relative placement of the boxes and of the terminals in terms of the axis of ordinates; generation and resolution of a third system of equations to place the boxes and the cables in an absolute manner, and production of the wiring diagram corresponding to the numerical data obtained by the resolution of the systems of equations.

24 Claims, 9 Drawing Sheets

PROCESS FOR THE PRODUCTION OF AN ELECTRICAL WIRING DIAGRAM

CROSS-REFERENCE TO RELATED APPLICATION

This application claims priority to French Application No. 04 00168 Filed Jan. 9, 2004, the entire content of which is hereby incorporated by reference.

BACKGROUND OF THE INVENTION

1. Field of the Invention

The current invention concerns a procedure for the production of a wiring diagram.

The current invention is more specifically intended for the field of aeronautics. However, it can find applications in other sectors, whether it be in the field of transport (automotive, space, etc.) or in other industrial fields (production of industrial machines, computerized home electronic systems, etc.). More specifically, it concerns electrical cabling, but it also applies to the fields of hydraulics, pneumatics, etc. . . .

2. Discussion of the Background

In a modern aircraft, the electrical circuits utilize a significant number of components and are relatively complex. In order to represent them, so that they may first of all be manufactured, then subsequently attended to during service maintenance of the aircraft, basic plans are produced on the one hand, and wiring diagrams, on the other.

An aircraft is composed of different electrical systems (engines, electrical generation, flight controls, braking system, etc.). Each one of these systems is segmented into different chapters, also called functions pursuant to the ATA100 standard (Air Transport Association). The basic plans schematically describe the electrical interconnections between the different elements which compose one function within the system. They allow for a good comprehension of the function described and facilitate troubleshooting during failures. The diagrams (or plans) for the wiring layout, also referred to as WD in abbreviated form which stands for Wiring Diagram (that is to say, the diagram for the wiring layout in English) are designed based on the information contained in the basic plans and they integrate all of the information required for manufacturing the corresponding function in the system. A wiring diagram also makes it possible to provide the department in charge of producing the electrical system with a list of the cables.

Currently, the basic plans as well as the wiring diagrams are produced by hand. Of course, CAD software applications (computer aided design) are used to produce these plans and diagrams. The design of the drawing in and of itself however, remains the responsibility of the draftsman who must position the components and produce routing for the cables which connect said components.

SUMMARY OF THE INVENTION

The objective of the current invention is to replace the manual production of the wiring diagrams that are produced over the course of the service life of an aircraft (or of any other industrial "machine") with automatically generated diagrams. Numerous graphic design rules must be complied with. The automatic production of the wiring diagrams is rendered very complex by virtue of the number of graphic design rules. Among the existing constraints, one can cite, for example, the fact that a cable represented on a diagram must not traverse a component that is represented on said diagram. Cables are not permitted to be superimposed. They must be represented solely by horizontal or vertical segments. A sufficient amount of space must be maintained between two neighboring "objects" (cables or components). Other constraints that are less stringent must equally be observed by preference. Thus, for example, the various components represented must preferably be vertically aligned. Furthermore, the number of crossings between cables as well as the number of bends produced by said cables must be kept to a minimum. These constraints are provided here as examples and the list is not intended to be exhaustive.

In order to allow for the production of automatically generated wiring diagrams, the current invention proposes a procedure for the production of a wiring diagram on which boxes are located, each representing a component (or a part of a component) that is used in a device subject to cabling, on which conducting lines are located, each representing a connection between two components, and on which terminals are located, corresponding to a possible point of connection between a conducting line and a box, said boxes being arranged along an axis of abscissas and an axis of ordinates.

In accordance with the invention, this procedure is comprised of the following steps:

input of the components to be represented on said wiring diagram, each component being of a predetermined type to which correspond certain constraints that were previously translated in the form of linear equations, input of connections to be represented on said wiring diagram, generation of a first system of equations and resolution of said system to optimize the relative positioning of the boxes on the axis of abscissas in terms of predetermined abscissas as well as to optimize the orientation of said boxes, generation of a second system of equations and resolution of said system to optimize the relative placement of the boxes in terms of the axis of abscissas as well as the relative positioning of the terminals for each box in terms of same said axis, and generation of a third system of equations and resolution of said system so as to place the boxes in an absolute manner in terms of the axes of the abscissas and of the ordinates, and also to optimize the routing of the connections.

To be understood under the term "input" further above, is any manner, whether manual or automatic, which allows the introduction of data into an information system such as, for example, data acquired from or output by a data base.

A break down of the complex problem subject to being resolved is what allows us to solve this problem here so as to be able to produce a wiring diagram. The manner of segmenting this problem also allows us, for each step, to understand the wiring diagram in its totality each time.

In the diagram to be produced, the connections to be represented are designated, for example, as cables and they are comprised of one or several wires. A sheath is possibly associated to a cable comprised of several wires. During the relative positioning of the boxes on the axis of abscissas, the cable sheaths are advantageously relatively positioned in terms of the boxes to which they are connected. The cable sheaths are treated here a little differently from the other components, since they constitute components of a specific type. In fact, the sheaths differ from the other components represented specifically by the fact that they constitute components which can be traversed by wires and/or by cables and that they can exhibit connection points intended for the graphic representation of eventual checkpoints for shielding.

In the process described above, the step comprising the generation of a third system of equations is advantageously implemented by the two following substeps:

Generation of a third system of equations and resolution of said system so as to place the boxes in an absolute manner in terms of the axis of ordinates, and Generation of a fourth system of equations and resolution of said system so as to place the boxes in an absolute manner in terms of the axis of abscissas and to optimize the routing of the connections.

In a procedure in accordance with the invention, the optimization of the routing for the connections advantageously provides for the verification of the presence of a locating place on the connections intended for placing a text. In fact, most wiring diagrams provide that the connections (cables or wires) be registered by one or several texts. After having carried out the verification of the presence of a locating site for positioning text, the positioning of said text on the connections is determined, for example, by resolution of a system of equations.

In order to be able to also resolve non-linear problems by a procedure in accordance with the invention, it is proposed, for example, that the linear equations posited here solely make use of whole numbers.

In an original manner, it is hereby provided that a box be defined by its size, its terminals and that it possibly bear a graphic symbol and/or a text and/or a cable symbol associated to one or several terminals.

As indicated further above, the boxes used are of different types. The type of box determines, for example among other things, whether the width of the box is variable, whether its height is variable, whether the sequential arrangement of its terminals is modifiable, whether the box is equipped with outlets, . . .

For the first system of equations mentioned further above, we advantageously assume that the different boxes to be represented are arranged on a predetermined number of vertical lines, and we provide that said first system of equations is comprised of equations translating the constraints relating to the height placement of the boxes on said vertical lines.

The first system of equations can also be comprised of equations that evaluate the number of bends produced in the conducting lines linking the boxes and comprised of other equations to minimize the latter number in the resolution provided in the corresponding step.

The second system of equations called to mind further above is in and of itself comprised, for example, of equations that translate the constraints associated to the grouping of the connecting terminals within the different boxes. One can also provide that this second system of equations is comprised of equations that evaluate the number of intersections produced between the conducting lines linking the boxes and that this number shall tend to be reduced in the corresponding step.

As to the absolute placement of the boxes along the axis of the ordinates, the connecting terminals of the boxes are advantageously arranged at altitudes which are all multiples of a predetermined grid pitch. For this same placement, one can equally establish equations that evaluate the number of disconnects in the linking lines and minimize this number of disconnects.

As to the absolute placement of the boxes along the axis of abscissas, the number of overlaps in the linking lines in the horizontal direction and in the vertical direction is advantageously evaluated and then subsequently reduced. In this instance, one can also, for example, evaluate and minimize the number of intersections in the linking lines.

In a procedure, in accordance with the invention, to establish the equations for the various equation systems, one advantageously defines real variables, for example, variables corresponding to a localization, a dimension etc. on the one hand, and defines binary variables assuming either a value of 0, or a value of 1, for example, to indicate that an element belongs to a set, or to indicate the relative positioning of two elements, etc. on the other hand, and after this and with the aid of said variables, the equations are the translation of constraints proper to the type of wiring diagram to be produced.

So as to obtain a wiring diagram on a monitor screen or on any other means of visualization, or even yet on a paper medium or on such similar medium, after the implementation of a procedure such as the one described further above, one provides that such a procedure is furthermore comprised of the following steps, after the steps of resolution of the various equation systems:

introduction of the solutions resulting from said resolutions in a translator that allows for the production of a diagram based on the numerical data, and production of a diagram corresponding to the numerical data obtained by the resolution of the equation systems.

The invention also targets an information system and a compiler comprising the means adapted to execute a procedure such as the one briefly described above.

The invention also targets a readable data medium by way of an information system, possibly totally or partially interchangeable, more specifically a CD-ROM or a magnetic recording medium, such as a hard disc or a floppy disc, or a transmitting medium, such as an electrical or optical signal, and comprised of instructions from a computer program allowing for the implementation of a procedure such as the one briefly described above, when said program is loaded with and executed by an information system.

The invention also targets a computer program stored on an information storage medium, and comprising instructions that allow for the implementation of a procedure such as the one briefly described above, when said program is loaded with and executed by an information system.

BRIEF DESCRIPTION OF THE DRAWINGS

The details and advantages of the current invention shall better stand out as a result of the description that follows, which is made in reference to the appended schematic drawing on which.

DESCRIPTION OF THE PREFERRED EMBODIMENTS

Figure 1:
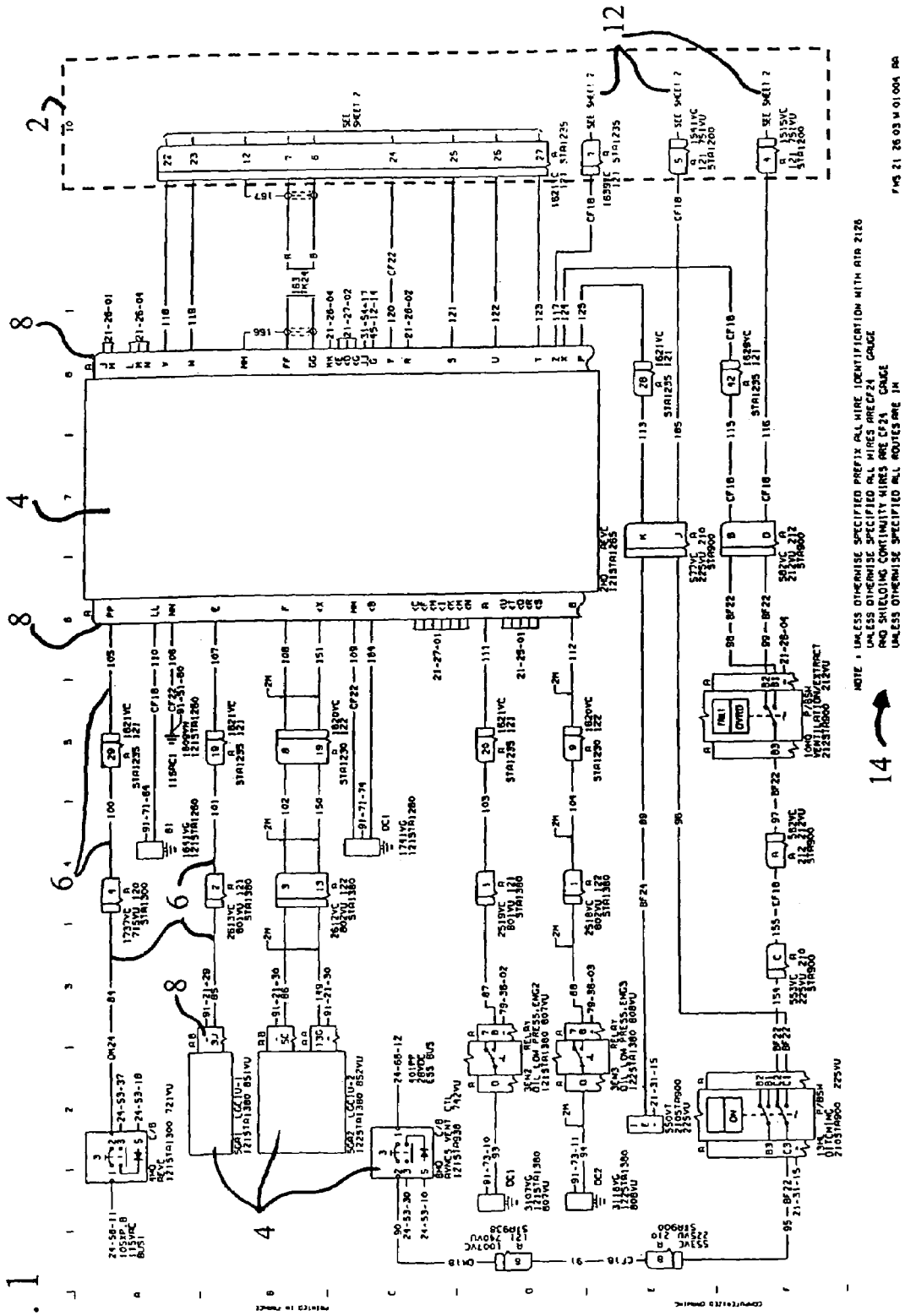
FIG. 1 represents an example of a wiring diagram to be produced by a procedure in accordance with the invention.

FIG. 1 represents an example of the wiring diagram that can be produced with the aid of a procedure in accordance with the invention. Such a wiring diagram represents all or a part of a device allowing for the production of an electric function. In the case of FIG. 1, one shall note the presence of a neutral zone 2, which permits the establishment of a link to another wiring diagram (not represented in the drawing).

One shall also note, on the wiring diagram from FIG. 1, the presence of boxes 4 with a more or less rectangular shape. There are numerous formats for box 4 types. These boxes are interconnected by the aid of links (or connecting lines) 6 symbolizing the cables. These connecting links 6 connect to the boxes 4 at the level of the terminals. The latter are arranged either directly on a box 4, or at the level of an outlet 8 integral with the box 4. A same box 4 can simultaneously present with terminals for a direct junction to a connecting line 6 and with one (or several) outlet/s 8 equipped with at least one terminal. Some boxes 4 simply present in the form of a rectangle equipped with outlets and/or terminals. Beyond this, other boxes 4 are additionally comprised of a graphic representation that allows for the identification of the component represented by the box. One shall also note that associated to each box 4 and to each line 6, there is a text formed of alphanumerical characters allowing for the identification of the box or of the corresponding conducting line.

Figure 2:
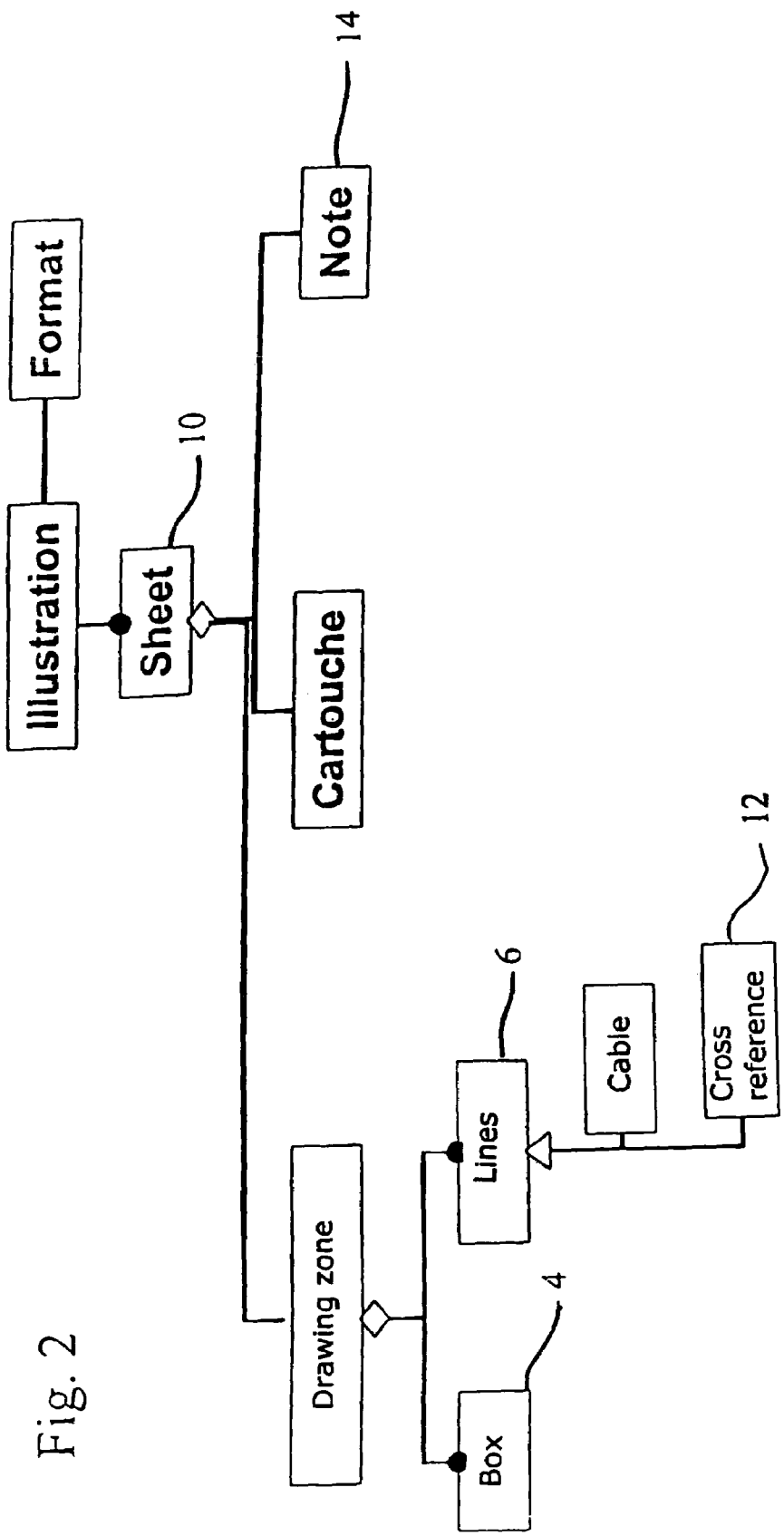
FIG. 2 schematically indicates the graphic composition of a wiring diagram.

FIG. 2 recapitulates the various elements that constitute a wiring diagram. Within said FIG. 2 is located the sheet 10 on which the wiring diagram is produced. This sheet bears the English equivalent of "sheet". For this sheet 10, it is important that one know its format in particular (for example, A3 or A4) as well as what is illustrated on said sheet. On the lower portion of FIG. 2, the various elements that compose the sheet 10 have been represented. First of all, there is a drawing zone that is described further above and on which appear, more specifically, the boxes 4 and the lines 6. A line 6 more specifically represents a cable (or a wire) as indicated further above, but in certain cases the line in question can be considered as a cross reference 12 as can be seen from FIG. 1.

One also generally finds a cartouche on the sheet 10 (not represented in the drawing) which most often presents itself in the form of a rectangle. Said cartouche is usually arranged to the right of the sheet and/or beneath the drawing zone. It receives the inscriptions that are required and sufficient for the identification and utilization of the document. Such a cartouche most often also contains the name of the company producing the corresponding wiring diagram as well as the name of the person who produced said diagram. Other indications (title, date, identification number, etc. . . . ) can also appear in the cartouche. In addition to this cartouche, it is also possible to provide notes 14 as can be seen more specifically in FIG. 1. The latter provide general indications on the components represented in the drawing zone.

Figure 3:
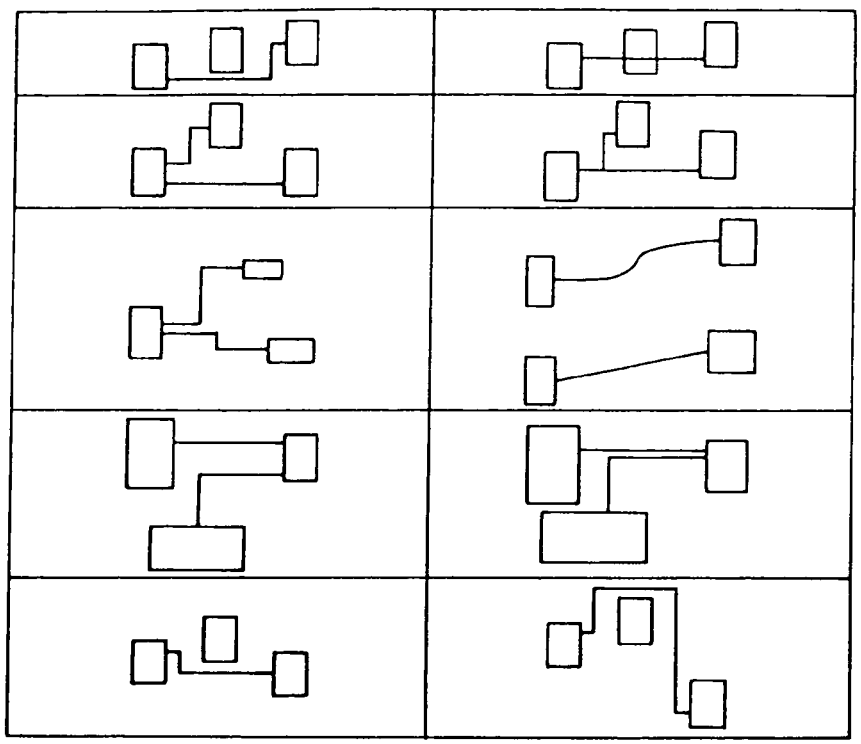
FIG. 3 is a table schematically representing imperative constraints during the production of a wiring diagram.

As is known to the person skilled in the art, drawing rules must be observed for the production of a wiring diagram. The table in FIG. 3 reiterates some of these rules for the sake of illustration. The left hand column in this table illustrates graphic representations that are correct as opposed to the right hand column which illustrates graphic representations that are incorrect. The table in FIG. 3 thus reminds us that a line 6 may not intersect a box 4. Two distinct lines may not be superimposed either. These lines must be represented by horizontal or vertical segments. It is also appropriate to allow for a sufficient amount of spacing (generally, 5 mm) between the various objects that appear in the drawing zone (boxes and lines). Finally, the table in FIG. 3 illustrates that a line may not go around a component.

Figure 4:
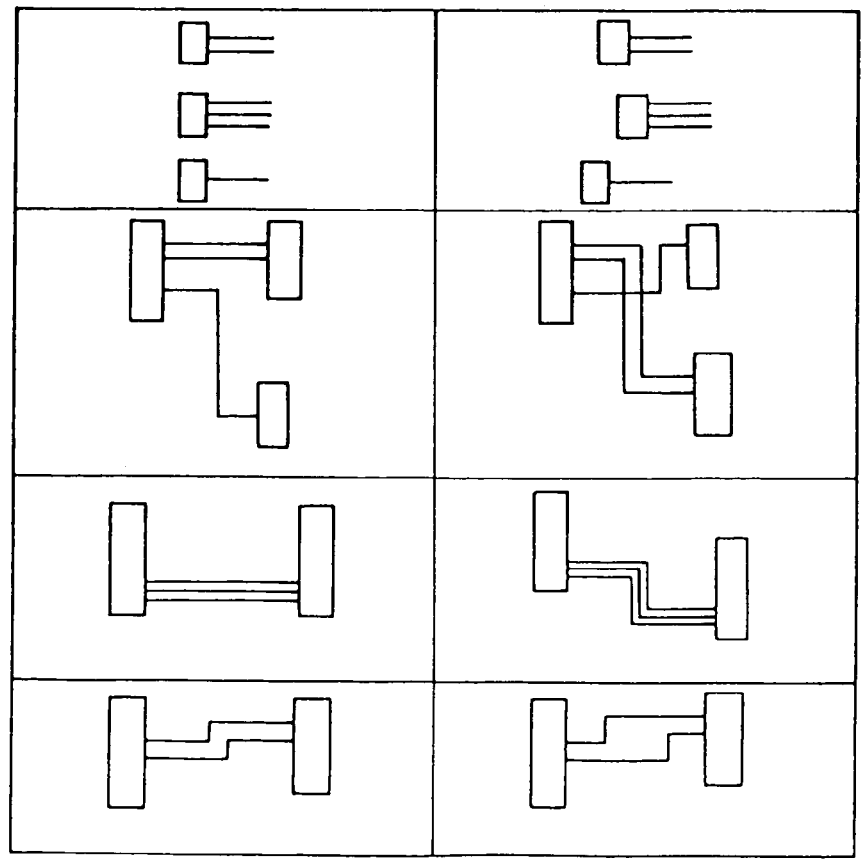
FIG. 4 is a table schematically representing the constraints for optimization during the production of a wiring diagram.

The table in FIG. 4, in and of itself, illustrates the constraints for optimization which should be implemented to the extent possible. The left hand column in this table illustrates graphic representations that are preferred as opposed to the right hand column which illustrates graphic representations that are to be avoided to the extent possible. Thus, it is preferable to align the boxes vertically, to minimize the number of crossings between lines as well as the number of bends formed by said lines and also to harmonize the routing of the lines.

Figure 5:
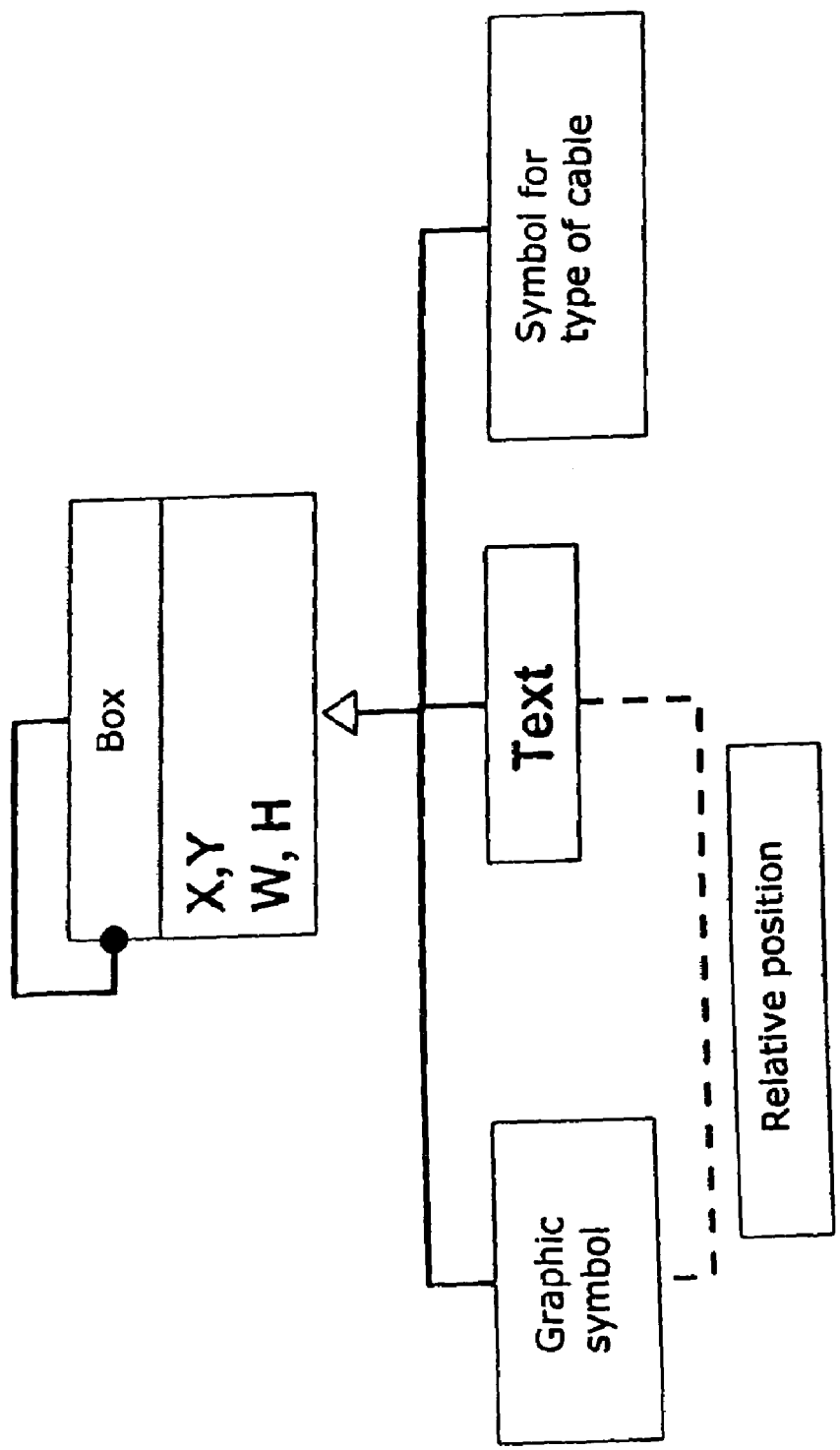
FIG. 5 schematically illustrates the graphic composition of a box appearing in a wiring diagram.

FIG. 5 schematically illustrates the graphic composition of a box appearing on a wiring diagram. Said box is arranged on an x abscissa and on a y ordinate in the wiring diagram. It is rectangular in shape and presents with a width w (in the direction of the axis of abscissas) and with a height h (in the direction of the axis of ordinates). In addition to its rectangular contour, a box 4 can possibly bear a graphic symbol and/or a text and/or a symbol for the type of cable to be connected to said box.

Figure 6:
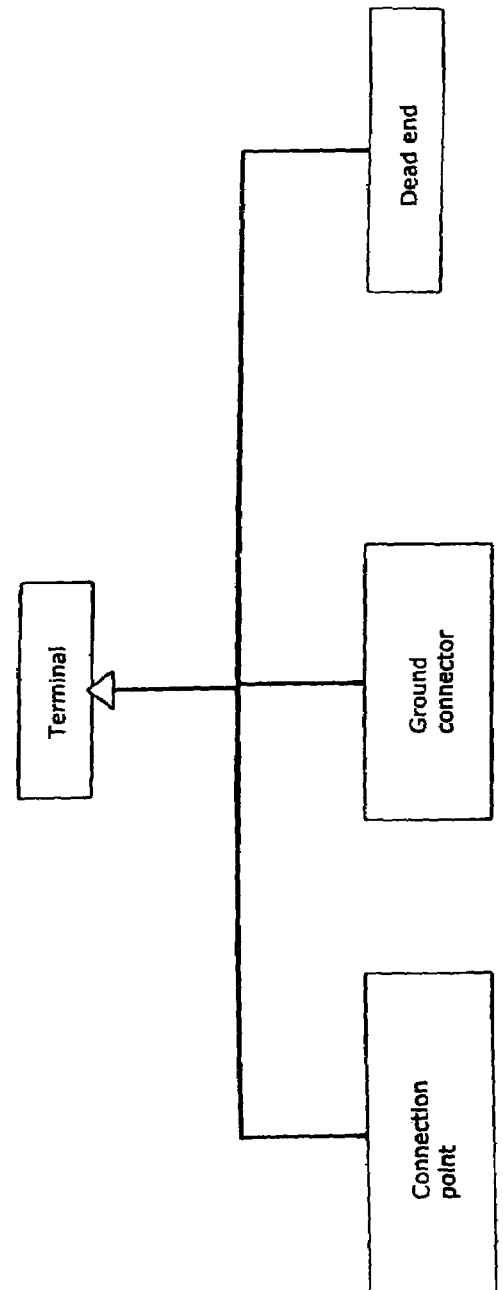
FIG. 6 schematically illustrates the graphic composition of a terminal associated to a box.

FIG. 6 shows the graphic composition of a terminal. Here, a terminal is considered as a connection point or as a ground connector or even as a dead end (that is to say, the end of a cable that is not connected and capped with a shield).

For the implementation of a procedure in accordance with the invention, it is appropriate to preliminarily analyze the different types of boxes to be represented. One shall note in fact, depending on whether a box 4 represents one such component or another such component, that different constraints shall be made to apply for the box to be represented. Thus, as an example, the box can have given dimensions that are set or it can have variable dimensions. For certain components, it is possible to represent the corresponding terminals in a given sequential order or else, in any order.

Thus, after analyzing all of the components that can be represented on the wiring diagram, it is appropriate to regroup the components by their type and in function of the constraints to be observed when one starts drawing the box representative of said component on the wiring diagram.

Figure 7:
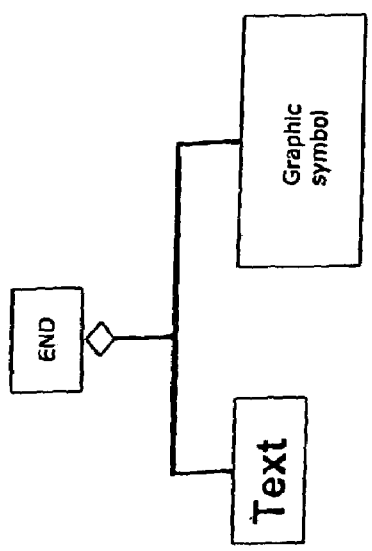
FIGS. 7 through 9 schematically illustrate three types of components that may be represented on a wiring diagram.
Figure 8:
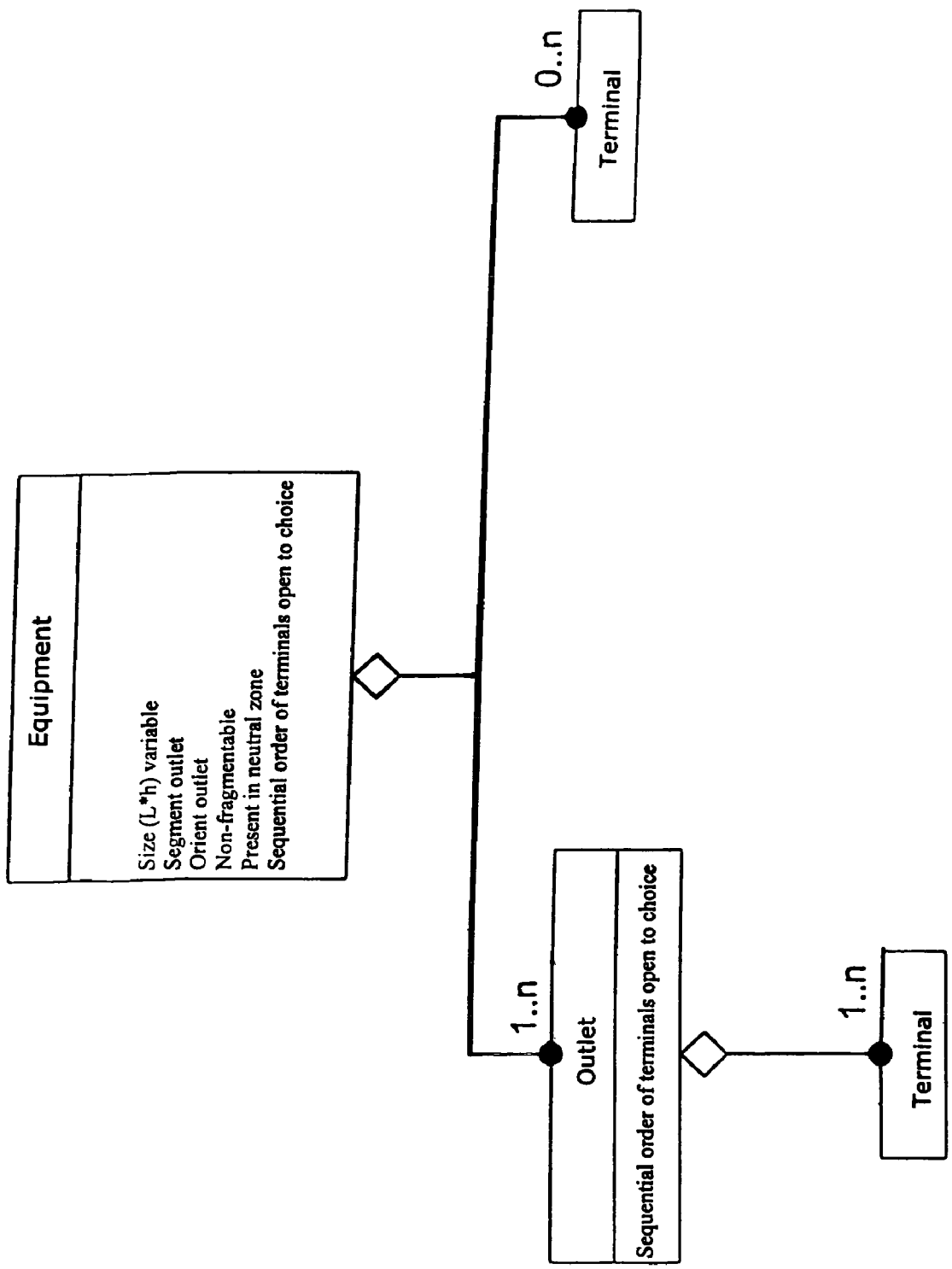
Figure 9:
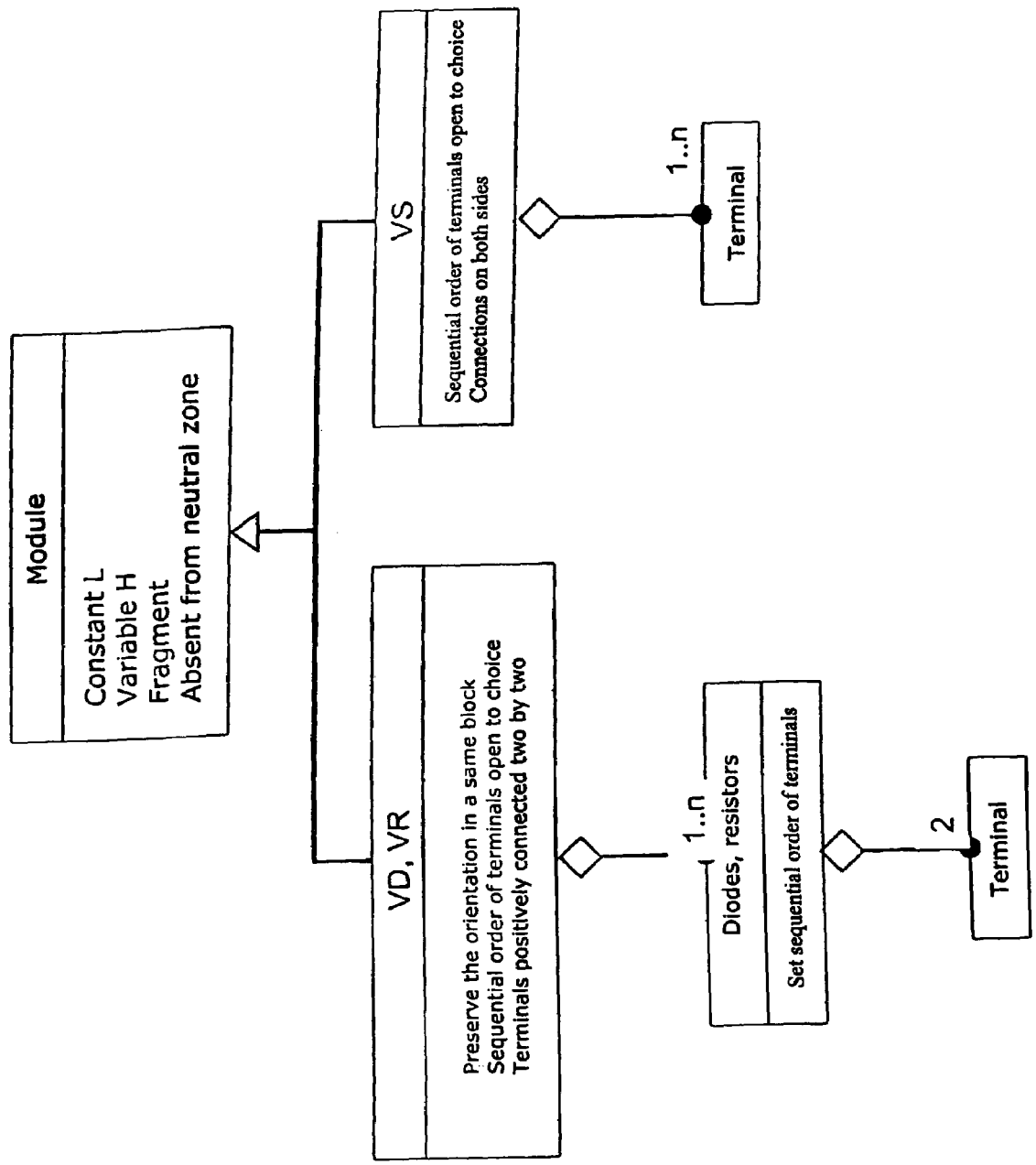

FIGS. 7 through 9 represent different types of components. In FIG. 7, a component has been represented designated as "END". Such a component is comprised exclusively of a text and of a graphic symbol. Such a component can be found, for example, at the end of a line.

In FIG. 8, a type of component is described which has been arbitrarily named "equipment". As indicated in this figure, a box representing a component of the "equipment" type comprises 1 to n outlets and between 0 to n terminals. Each outlet comprises 1 to n outlets and the sequential order of said terminals in the outlet is open to choice. As to the component of the "equipment" type, its size may vary in terms of its height as well as its width. It is possible to segment the outlet of the component into two "sub-outlets". It is possible to orient the outlet of said "equipment". However, the latter is not fragmentable. It can be present in a neutral zone 2 of a wiring diagram. The sequential order of the terminals in this component is open to choice.

In FIG. 9, several types of components are defined. Thus, we first have components of the "diode, resistor" type. Such a component is comprised of two terminals and the sequential order of the terminals is set. Then we have a component of the "VD, VR" type. Such a component comprises 1 to n components of the "diode, resistor" type. In said components of the "VD, VR" type, it is appropriate to maintain the same orientation within one block, the sequential order of the blocks is open to choice and the terminals are positively connected two by two. In a component of the "VS" type, we again find 1 to n terminals. The sequential order of the terminals is open to choice and the connections are produced on both sides of the component. Finally, said FIG. 9 defines a component of the "module" type which is comprised either of a component of the "VD, VR" type, or of a component of the "VS" type. Such a "module" is constant in its width, it presents with a height that is variable, it can be fragmented and it is never located in a neutral zone (the section common to two adjacent sheets).

Of course, it is preferable to have the most possibly restrained number of component types. In function of the application (aeronautical, automotive, computerized home electronic systems, etc...), the number of component types shall be more or less great. This definition for the types is finalized once and for all prior to the implementation of the procedure in accordance with the invention.

Prior to then producing a diagram, it is appropriate to indicate the different components that must be represented on said diagram as well as the manner in which the components are linked. This plurality of information can, for example, be acquired from the basic plan corresponding to the diagram which is to be produced or else retrieved from a data base.

The procedure in accordance with the invention then provides to formulate equations for the data corresponding to the information supplied concerning the boxes to be represented and the conducting lines between said boxes. One could project producing a system of equations that reiterates all of the constraints associated to the production of the wiring diagram. One would then obtain a system of equations so great in size that no computer could actually resolve the equations, even though just ten or so boxes would have to be represented at the least (which is the case for most wiring diagrams). Therefore, the present invention proposes to break down the problem into several subproblems, keeping in mind all the while to consider the inclusiveness of the wiring diagram each step of the way. In the description that follows, the problem, considered as a whole, is resolved by four successive operations. In certain cases, the third and the fourth operations can be regrouped into a single operation.

The present invention also proposes to use linear programming. Advantageously, in the equations and inequalities then written up, only whole numbers shall be used. By these means, it shall then be possible to resolve non-linear problems. We shall then translate into the form of linear equations, on the one hand, the constraints associated to the rules of drafting as well as on the other hand, the constraints defining the types of boxes to be represented.

Figure 10:
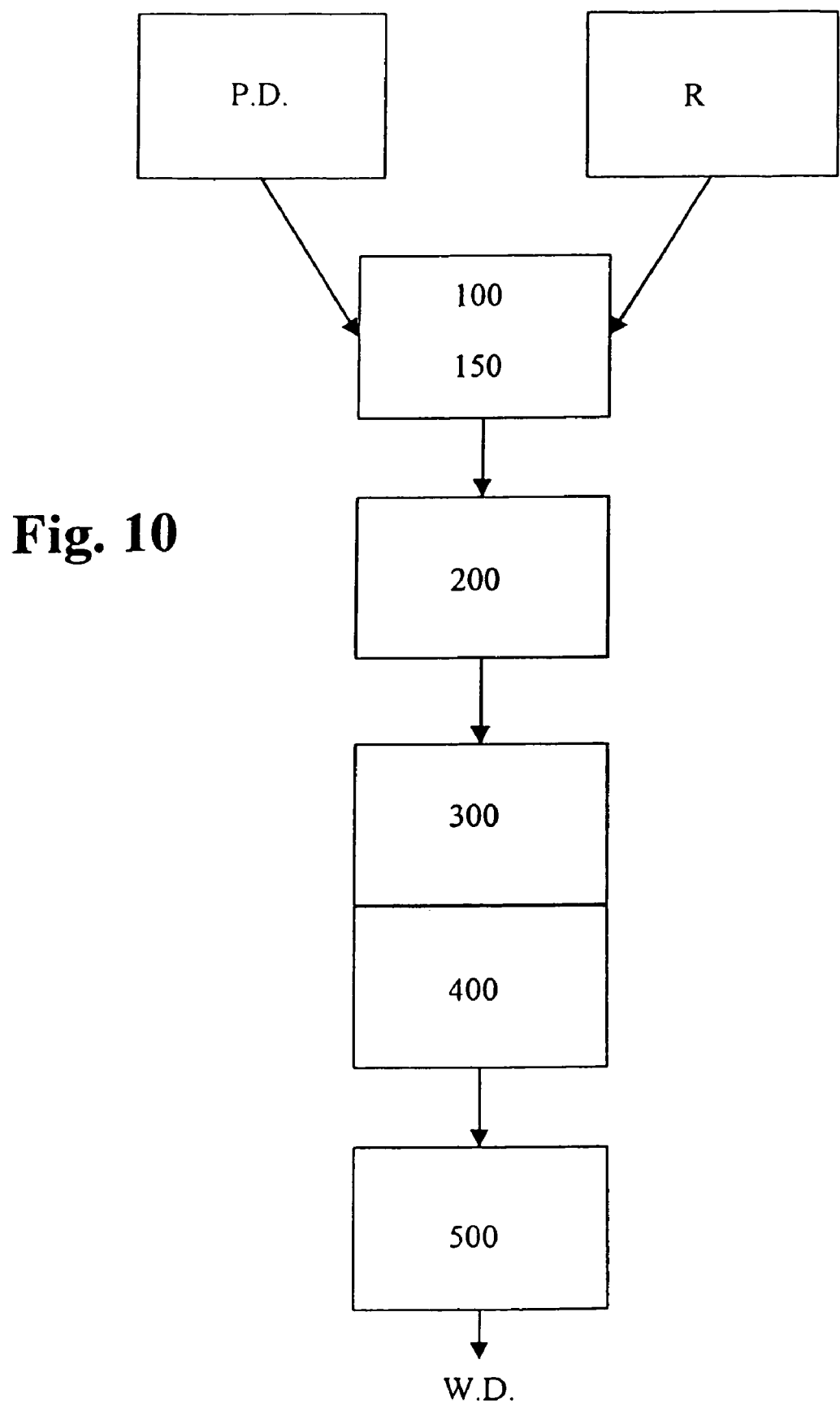
FIG. 10 schematically represents a procedure flow diagram for the production of a wiring diagram in accordance with the invention.

In FIG. 10, we have schematically represented the major stages of a procedure for the production of a wiring diagram in accordance with the invention. Based on the data that is to be found in a basic plan, designated in FIG. 10 as P.D. (for Principal Diagram or basic plan in English) and based on the rules R, such as those schematically represented in FIGS. 3 and 4, we shall establish various systems of equations. In a first stage 100, equations are described that translate the constraints for the relative placement of the boxes to be positioned and for the orientation of said boxes. In this first stage, we consider the relative positioning of the boxes 4 on the horizontal axis. A reference 150 is entered in the rectangle corresponding to the first operation to indicate that after the relative placement of the boxes on the horizontal axis, we then separately carry out the relative placement of the cable sheaths on the horizontal axis.

In the second stage bearing the reference number 200, we are then interested in the relative placement of the different components on the vertical lines. This placement more specifically affects the crossings produced between the connecting lines 6. After resolving the equations written over the course of this second stage, we shall then know the relative positioning of the various components in the vertical direction.

The various components being relatively placed in terms of one another, we now turn to the third stage bearing the reference number of 300 for the absolute placement of the different boxes 4 on the vertical lines. To optimize this placement, we shall attempt to limit the number of bends made by the connecting lines that connect the boxes.

The fourth stage, bearing the reference number of 400, then concerns the absolute placement of the various elements in the horizontal direction. Over the course of this stage 400, equations are established and resolved to finalize the routing of the cables and to place the texts that are to be inscribed on the wiring diagram.

In certain cases, it is foreseeable that stages 300 and 400 can be treated as one single stage. This is symbolized in FIG. 10 by the joint boxes symbolizing stages 300 and 400. This procedure in accordance with the invention, after the implementation of stages 100, 200, 300 and 400, allows us to obtain a wiring diagram W.D.

As illustrated in FIG. 10, a stage 500 can also be provided. In question is a stage concerning the placement of the texts on the obtained diagram as well as the insertion of comments or such similar items, such as for example concerning the routing that is used in wiring diagrams for the aeronautical industry. This stage can be integrated in a procedure in accordance with the invention but it can also be carried out as an entirely separate procedure.

Figure 11:
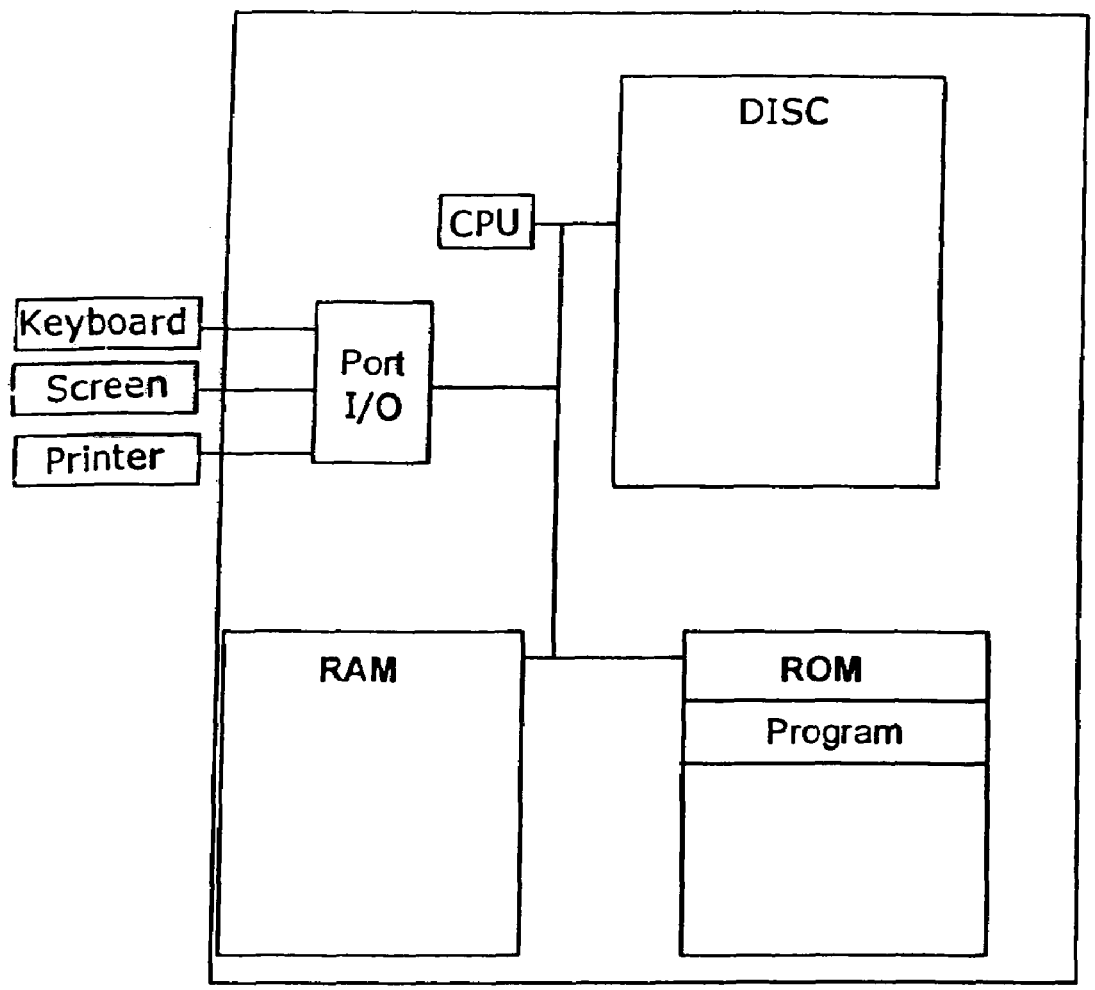
FIG. 11 represents an information system comprised of the means adapted to the implementation of the procedure that is schematically illustrated in FIG. 10.

FIG. 11 schematically represents a device adapted to the execution of a procedure for the production of wiring diagrams in conformity with the current invention, in a preferred mode of embodiment.

This device can more specifically be comprised of a computer.

In the exemplary embodiment described here, the device for the production of wiring diagrams is comprised of a keyboard, a monitor screen and a printer connected to an input-output port of a processing card.

The processing card is comprised of the following which are interconnected by an address bus and a data bus:

A central processing unit or CPU;

A read and write memory or RAM;

A read only memory or ROM;

A non-volatile memory or DISC and

The input-output port or E/8.

Each of the elements illustrated in FIG. 11 is well known to the person skilled in the art of microprocessors and, more generally, of data processing systems. These common elements are therefore not described here.

The non-volatile memory on DISK is comprised, for example, of a hard disc.

The read only memory, or ROM is adapted to save the operating program of the central processing unit or CPU. More specifically, it is comprised of a "program" register to memorize the instructions of a program which implements a procedure that is in conformity with the invention such as it is described in the preceding in reference to the procedure flow diagram from FIG. 10. The wiring diagrams produced can be visualized on a monitor screen and printed out by the printer of the information system.

In the description that follows and for each operation, examples of equations are indicated that are provided on an exemplary basis and which allow the person skilled in the art to posit the equations corresponding to his problem so as to produce a wiring diagram in a mode that is automatic.

First Operation

The objective of this first operation is to place the boxes and other elements to be represented in relation to one another in the horizontal direction. We are assuming here that the wiring diagram, which is a two dimensional [2D] plan, is comprised of an axis of abscissas (x) that is horizontal and of an axis of ordinates (y) that is vertical. The abscissas increase from the back toward the front of the plan and the ordinates increase from the bottom toward the top of the plan.

During this first operation, we also wish to orient the components. A good orientation of the components allows us to limit the number of bends produced at the level of the connecting lines. For each box, there are at least two possible orientations. As previously indicated further above, the boxes are rectangular in shape. They present with two horizontal sides and with two vertical sides. The terminals of a box are arranged on the vertical sides. The orientation of a box therefore consists in determining the orientation of the terminals for this box: Which terminals are toward the front of the wiring diagram? If the box is comprised of independent terminals, there can be a large number of possible orientations for the terminals.

In order to align the boxes on the vertical lines, one can, for example, provide ten vertical lines on the wiring diagram and place the boxes to be represented as centered on said vertical lines. The first and/or the last and/or none of said vertical lines from the diagram to be represented correspond/s to a neutral zone 2. On the example from FIG. 1, only the last vertical line is in the neutral zone 2. In the neutral zone, only certain types of components are to be found.

Placement Variables

First of all, one can define the placement variables. We then consider a component x. We denote as k the number corresponding to a vertical line and X(x) as the abscissa of the component x. We then define the following variables:

$$ISX(x, k) = 1, \text{ if the component } x \text{ is on the abscissa } k,$$
$$\text{if not} = 0 \text{ and}$$
$$SS(x, k) = \sum_{j=0}^{k} ISX(x, j)$$

We obviously obtain:

$$\forall \times \sum_{k} ISX(x, k) = 1$$

as well as $$X(x) = \sum_{k} k.ISX(x, k)$$

For a component b located at the beginning of a sheet and for a component e located at the end of a sheet, we also have the following constraints:

$$\forall b \in \text{Begin } \forall x \in \text{Begin } \forall k SS(b,k) \geq SS(x,k)$$

$$\forall e \in \text{End } \forall x \in \text{End } \forall k SS(x,k) \geq SS(e,k)$$

Begin being the set of components located at the beginning of the sheet and End being the set of components being located at the end of the sheet.

Relative Placement of the Components

We are now considering two components x1 and x2. We then define the delta function for the relative position in the following manner:

delta(x1, x2)=0, if $X(x1)<X(x2)$ and delta(x1, x2)=1, if $X(x1)>X(x2)$

We obtain:

$\forall k(1-\text{delta}(x1, x2)) \geq ISX(x1,k)+(1-SS(x2,k))-1$ $\forall k \text{ delta}(x1,x2) \geq ISX(x1, k)+SS(x2, k-1)-1$ If x1 and x2 are connected, with x1 distinct from x2, we also have:

$\forall k \, ISX(x1, k)+ISX(x2, k) \leq 1$

This last line indicates that two components connected to one another are not located on the same vertical line.

However, we can also provide for making it possible to connect two components to one another that are located on the same vertical line. For the relative placement of the components, we then define the equations as follows:

delta(x1, x2)=0, if $X(x1)<X(x2)$ and delta(x1, x2)=1, if $X(x1)>X(x2)$ deq(x1, x2)=0, if $X(x1)=X(x2)$ and deq(x1, x2)=1, if $X(x1) \neq X(x2)$ In this case (vertical connections), we have the following equations:

deq(x2, x1)=deq(x1, x2)

delta(x1, x2)+delta(x2, x1)=deq(x1, x2)

$\forall k(1-\text{delta}(x1, x2)) \geq ISK(x1, k)+(1-SS(x2, k-1))-1$ $\forall k \text{ delta } (x1, x2) \geq ISK(x1, k)+SS(x2, k-1)-1$ $\forall k \text{ deq}(x1, x2) \geq ISK(x1, k)-ISK(x2, k)$ $\forall k \text{ deq}(x1, x2) \leq ISK(x2, k)-ISK(x1, k)$ $\forall k \text{ deq}(x1, x2) \leq 2-ISK(x2, k)-ISK(x1, k)$ These equations here above, in both cases (vertical connections or not) are only to be generated for one of the pairs (x1, x2) or (x2, x1).

Orientation Variables

We take a terminal b1 of a component x under consideration. We then define the orientation function [orient] in the following manner:

orient(b1)=0, if the cable extends toward the front, orient(b1)=1, if the cable extends toward the back, Bends α) Here, we are considering a connecting line between terminal b1 and terminal b2. In the case where there are no vertical lines, the presence of a bend on the b1 side is given by the following equation:

bend(b1, b2; b1)=|orient(b1)-delta(b1, b2)|

The presence of a bend on the b2 side is given by the following equation:

bend(b1, b2; b2)=|orient(b2)-delta(b2, b1)|

After this, we determine the position of the bend. Thus, if a connecting line between terminals b1 and b2 presents with a bend on the b1 side, on the vertical line k, we will then have:

bend(b1, b2; b1; k)=1, if the bend is on the vertical line k, if not=0.

We therefore have the two following equations for a bend on the b1 side on the vertical line k and for a bend on the b2 side on the vertical line k:

$\forall k$ bend(b1, b2; b1; k)=ISX(b1, k).bend(b1, b2; b1)

$\forall k$ bend(b1, b2; b2; k)=ISX(b2, k).bend(b1, b2; b2)

Such a function is then implemented with the aid of the following constraints for the b1 side:

bend(b1, b2; b1)≧orient(b1)−delta(b1, b2)

bend(b1, b2; b1)≧delta(b1, b2)−orient(b1)

$\forall k$ bend(b1, b2; b1; k)≧bend(b1, b2; b1)+ISX(b1, k)−1

We carry out a similar implementation for the b2 side.

β) In the case where vertical connections are planned, the presence of a bend on the b1 side, or respectively on the b2 side, is provided by the following equations:

bend(b1, b2; b1)=deq(b1, b2)|orient(b1)−delta(b1, b2)| bend(b1, b2; b2)=deq(b1, b2)|orient(b2)−delta(b2, b1)|

The same applies as previously. We have:

$\forall k$ bend(b1, b2; b1; k)=ISX(b1, k).bend(b1, b2; b1)

(Bend side b1 on the vertical line k)

$\forall k$ bend(b1, b2; b2; k)=ISX(b2, k).bend(b1, b2; b2)

(Bend side b2 on the vertical line k)
This function is implemented with the aid of the following constraints for the b1 side:

bend(b1, b2; b1)≧deq(b1, b2)+(orient(b1)−delta(b1, b2))−1 bend(b1, b2; b1)≧deq(b1, b2)−(orient(b1)−delta(b1, b2))−1

$\forall k$ bend(b1, b2; b1; k)≧bend(b1, b2; b1)+ISX(b1, k)−1

We carry out a similar implementation for the b2 side.

A vertical connection with the correct orientations counts for one bend, if not for two.

Vertbend(b1, b2)=(1−deq(b1, b2)) (1+|orient(b2)−delta(b2, b1)|)

implemented with the aid of the constraints:

Vertbend(b1, b2)≧2(1−deq(b1, b2))+(orient(b2)−delta(b2, b1))−1

Vertbend(b1, b2)≧2(1−deq(b1, b2))−(orient(b2)−delta(b2, b1))−1

The above equations are to be generated only for one of the pairs (x1, x2) or (x2, x1).

Points of Passage

A point of passage on the vertical line k is created for the connection between x1 and x2, if:

X(x1)≦k−1 and X(x2)≧k+1 or X(x1)≧k+1 and X(x2)≦k−1 given:

Passage(x1, x2; k)=SS(x1, k−1)(1−SS(x2, k))+SS(x2, k−1)(1−SS(x1, k))

implemented in the form of:

Passage(x1, x2; k)≧SS(x1, k−1)+(1−SS(x2, k))−1

Passage(x1, x2; k)≧SS(x2, k−1)+(1−SS(x1, k))−1

A point of passage can also be created, if x1 and x2 are on the same vertical line, but with different orientations:

Vertpass(x1, x2)=(1−deq(x1, x2))|orient(x1)−orient(x2)|

$\forall k$ vertpass(x1, x2; k)=ISX(x1, k) vertpass(x1, x2)

implemented in the form of:

vertpass(x1, x2)≧(1−deq(x1, x2))+orient(x1)−orient(x2))−1 vertpass(x1, x2)≧(1−deq(x1, x2))−orient(x1)−orient(x2))−1

$\forall k$ vertpassK(x1, x2; k)≧vertpass(x1, x2)+ISK(x1, k)−1

The above equations are to be generated only for one of the pairs (x1, x2) or (x2, x1).

Size Constraints in Terms of Height

We are interested in the spatial height occupied by the components.

First of all, we take a type 1 component x under consideration. We assume that a component of this type is comprised of outlets. Let p be such an outlet. We designate $Pr_0$ as the function indicating whether an outlet is present on the right side. The function $Nb_0$ indicates the number of terminals on the right side. We then have:

$Pr_0(x, p)=1$, if at least one terminal of the outlet p is on the right side, if not=0.

$Nb_0(x, p)$=the number of terminals on the right side $\forall$ terminal b∈p, $Pr_0(x, p)$≧1−orient(b)

$$Nb_0(x, p) = \sum_{b \in p} (1 - \text{orient}(b))$$

For the left side, we will have:

$Pr_1(x, p)=1$, if at least one terminal of the outlet p is on the left side, if not=0.

$Nb_1(x, p)$=the number of terminals on the left side $\forall$ terminal b∈p, $Pr_1(x, p)$≧orient(b)

$$Nb_1(x, p) = \sum_{b \in p} \text{orient}(b)$$

If one considers that H(x) is the height of the component x, this height is the maximum of the heights on each side of the component x. We therefore have:

$$H(x) \geq \sum_{p \in x} (Nb_0(x, p) + 2Pr_0(x, p)) + \text{textheight}(x)$$

-continued $$H(x) \geq \sum_{p \in x}(Nb_1(x, p) + 2Pr_1(x, p)) + textheight(x)$$

If one now considers all of the components, that is to say those of a type different from type 1, and if one wishes to know the height that is taken up by the components on a line k, then we have the following equation:

$$E_k = \sum_{x, type(x) \neq 1} ISX(x, k).Size(x) + \sum_{x, type(x)=1} H(x, k)$$

where $E_k$ is the height occupied by all of the components on the vertical line k and size(x) is the height of a component x which is not of type 1.

In the same manner, we define the space occupied by the bends [C] in the following manner:

$$C_k = \sum_{x1 \leftrightarrow x2}(bend(x1, x2; x1; k) + bend(x1, x2; x2; k)),$$

and the space occupied by the points of passage:

$$P_k = \sum_{x1 \leftrightarrow x2}(passage(x1, x2; k) \text{ (no vertical connections)}$$

$$P_k = \sum_{x1 \leftrightarrow x2}(passage(x1, x2; k) + vertpassK(x1, x2; k))\text{(if not)}$$

The overall constraint is therefore written up as:

$$\forall K\ E_k + W_{bend}C_k + W_{pass}P_k \leq sheetheight$$

$W_{bend}$ and $W_{pass}$ are set, for example, at 1.

In function of the types of components that must figure on the diagram, it is possible that additional constraints will appear. These constraints shall be transcribed in the form of linear equations that will have to be added to the types of equations defined above.

In this first operation, it is also provided that the relative sequential order of the components shall be optimized in the horizontal direction, for example, by limiting the number of bends and points of passage. We therefore propose as an additional constraint, in the case where there are no vertical connections, to optimize the following function:

$$C_1 \sum_{e \leftrightarrow e'} \sum_k (bend(e, e'; e; k) + bend(e, e'; e'; k)) +$$

$$C_2 \sum_{e \leftrightarrow e'} \sum_k Passage(e, e'; k)$$

with, for example, $C_1=20$ and $C_2=1$.

With vertical connections, we minimize, for example, the following function:

$$C_1 \sum_{e \leftrightarrow e'} \sum_k (bend(e, e'; e; k) + bend(e, e'; e'; k) + vertbend(e, e')) +$$

$$C_2 \sum_{e \leftrightarrow e'} \sum_k passage(e, e'; k)$$

with, for example, $C_1=20$ and $C_2=1$.

The resolution of the system with the above disclosed equations and with the various constraints allow us to determine all of the values for the ISX(x, k) function for each component x and for all of the vertical lines k.

The resolution of this system of equations with the constraints also allows us to know the orientation of the various components x. We can therefore know the values of the orient (b) function for each terminal b of a component x.

Postprocessing Relative to the Sheaths

The object of this postprocessing step is to make the sheaths appear in the proximity of the components to which they are connected. We shall therefore leave the sheaths, or more specifically the boxes representing them, on their vertical lines and rather move them in blocks, while the sheaths shall be made to individually "float" while respecting the constraints of the sequencing process arrangement emerging from the above resolution of the system of equations. Thus, the previously effected optimization of the bends remains valid.

The vertical lines $0, \ldots, XMAX$ shall be moved at the level of the $X_0, \ldots, X_{XMAX}$ coordinates (whole variables). To keep the sequencing process arrangement, we therefore have the following constraint:

$$\forall i \leq 1\ Xi \geq Xi-1+\delta_{i-1}$$

with $\delta_{i-1}$ being equal to 1, if the vertical line i−1 has at least one component which is not a sheath, if not=0 (we are not concerned with the vertical lines that contain nothing but sheaths).

Furthermore, between the two main vertical lines, there is either nothing, or there are at least two subvertical lines such that a sheath would appear to be in proximity of a component. We must have $(X_i - X_{i-1})$ being less than or equal to 1, greater than or equal to 3, but not equal to two. We therefore use the binary variables $ISB_i$ with the following constraints:

$$X_i - X_{i-1} \leq 1 + ISB_i.XMAX$$

$$X_i - X_{i-1} \geq 3 - (1 - ISB_i).XMAX$$

Each sheath g shall have a new coordinate $x_g$ (whole variable). The sheaths must comply with the constraints of arrangement defined for the components x. For all of the upstream components (non-sheaths) to which a sheath is associated and if $x_0(g)$ is the greatest coordinate of these components, we have:

$$x_g \geq X_{x0(g)}+1$$

Likewise, for all downstream components (non-sheaths) to which the sheath g is associated, if $x_1(g)$ is the smallest coordinate of the components, we have:

$$x_g \leq X_{x1(g)}-1$$

For all of the sheaths g' to which it is associated upstream:

$$x_g \geq x_{g'}+1$$

and for all of the sheaths downstream:

$$x_g \leq x_{g'}-1$$

The sheaths must not be located on the vertical lines that contain the components either. If $x_1(g) - x_0(g) \geq 2$, we must then also have:

$$\forall x \ x_0(g)+1 \geq x \geq x_1(g)-1 \ x_g \geq -1+(X\text{MAX}+1).d_{g,x}$$

$$\forall x \ x_0(g)+1 \leq x \leq x_1(g)-1 \ x_g \geq 1-X\text{MAX}(1-d_{g,x})$$

$d_{g,x}$ being a binary variable equal to 0, if $x_g < x$ and equal to 1, if $x_g > x$.

The new variable xmsheet (maximum number of vertical lines within a sheet) shall be recovered with the aid of the following constraint:

$$\forall k \ \text{xmsheet} \geq X_{(k+1)\text{XMAXSHEET}} - X_{k.\text{XMAXSHEET}}$$

where XMAXSHEET is the maximum number of vertical lines per component.

For all of the upstream components (which are not sheaths) to which a sheath (g) is connected by its points of passage, $x'_0(g)$ is the largest coordinate of these components, and the same applies to $x'_1(g)$ for all of the downstream components. We then minimize the function:

$$K_1 \sum_g \min(x_g - X_{x'_0(g)}, X_{x'_1(g)} - x_g) + K_2.\text{xmsheet}$$

with, for example $K_1=20$ and $K_2=1$.

Second Operation

While the first operation concerns the relative sequential order of the boxes in the horizontal direction, the second operation has the objective of relatively placing the boxes in terms of one another in the vertical direction. This vertical arrangement has an influence on the crossings between the connecting lines 6 linking the boxes 4. This second operation has the objective, on the one hand, of arranging the boxes on each of the vertical lines of the diagram (relative layout), and on the other hand, of arranging the terminals relative to one another, inside of each box. The relative position of the boxes and of the terminals shall be selected in such a manner so as to minimize the number of intersections between the connecting lines 6.

Representation of the Arrangement of Terminals

Let us assume two ordinates x and y on a same vertical line. We define a function d by analogy to the delta function from the first operation. d is defined in the following manner:

$d(x,y)=0$, if $x<y$ and $d(x,y)=1$, if $x>y$ (x and y being whole numbers, the case of $x=y$ being excluded)

We have $x-y=(2d(x, y)-1)(1+(M-1)u)$,

M being the upper terminal of $|x-y|$ and u being a continuous intermediary variable in [0, 1] expressing that $(x-y)$ is in $[-M, -1]$, if $d(x, y)=0$, or is in $[1, M]$, if $d(x, y)=1$.

Some constraints are associated to the function $d(x, y)$ which are then the following:

$$x-y-2d(x, y)-2(M-1)v-(M-1)u=-1$$

$$v \leq d(x, y) \quad (v \text{ represents } xy)$$

$$v \leq u$$

$$v \geq d(x, y)+u-1$$

$$0 \leq u \leq 1$$

$$0 \leq d(x, y) \leq 1$$

$$0 \leq v \leq 1$$

Grouping of the Terminals

Here, we consider a component of a given type for which there exists a set B of terminals b, all located on a same column, and all of the terminals from the B set must remain grouped together. To translate this constraint, we can consider that all of the terminals from B are arranged in sequence in the same manner as each one of the terminals not belonging to B. Thus, no terminal not belonging to B can be placed between two terminals belonging to B. We then come up with the following equation:

$$\forall b, b' \in B, \forall (e, q, c), x_e = x_b, c \notin B, d(y_b, y_{e,q,c}) = d(y_b, y_{e,q,c})$$

here, (e, q, c) represent a terminal.

e corresponds to the component to which the terminal belongs, q is possibly the outlet on which the terminal is located and c is the name of this terminal.

Optimization of the Intersections

α) Intersections Between Horizontal Connections:

We consider that all of the orientations are made in an ideal manner (in terms of the direction of the connections). Let us assume (e, p, b), a terminal of abscissa x and (f, q, c) a terminal of abscissa x+1, with (e, p, b)⇔(f, q, c), the expression:

$$D(e, p, b; f, q, c) = \sum_{(e',p',b') \mapsto (f',q',c'), x_{e'}=x_e, x'_f = x_f} |d(Y_{e,p,b}, Y_{e',p',b'}) - d(Y_{f,q,c}, Y_{f',q',c'})|$$

will count the number of cables that intersect the line (e, p, b)⇔(f, q, c).

We must minimize:

$$NHH = \sum_k \sum_{(e,p,b) \mapsto (f,q,c), x_e=x, x_f=x+1} D(e, p, b; f, q, c)$$

β) Intersections Between the Vertical Connections:

If on the same vertical line, there are connections between the terminals $b_1$ and $b_2$ on the one hand, and between the terminals $c_1$ and $c_2$ on the other hand, in order to avoid having the connections intersect, it is required that:

$[d(b_1, c_1)+d(b_1, c_2)+d(b_2, c_1)+d(b_2, c_2)]$ be an even number.

If N is equal to 0 or 4, the connections are completely disjointed.

If N is equal to 2, one is on the inside of another. We therefore write up:

$d(b_1, c_1)+d(b_1, c_2)+d(b_2, c_1)+d(b_2, c_2)=2A(b_1, b_2, c_1, c_2)+B(b_1, b_2, c_1, c_2)$ with $A(b_1, b_2, c_1, c_2)$ and $B(b_1, b_2, c_1, c_2)$ declared as variables that are whole numbers ($A(b_1, b_2, c_1, c_2) \leq 2$ and $B(b_1, b_2, c_1, c_2) \leq 1$ and we add $B(b_1, b_2, c_1, c_2)$ to the cost function.

The total number of intersections between the vertical lines is therefore:

$$NVV = \sum_x \sum_{\text{orient}} \sum_{b_1 \leftrightarrow b_2, c_1 \leftrightarrow c_2} B(b_1, b_2, c_1, c_2)$$

γ) Intersections Between Vertical Connections and Horizontal Connections:

If there is a vertical connection between the terminals $b_1$ and $c_2$ and if a horizontal connection starts from the terminal $c_1$, in order that the connections do not intersect, it is required that $d(b_1, c_1) = d(b_2, c_1)$.

We therefore add $|d(b_1, c_1) - d(b_2, c_1)|$ to the cost function:

$$IVH(b_1, b_2, c_1) + d(b_1, c_1) - d(b_1, c_2) \geq 0$$

$$IVH(b_1, b_2, c_1) - d(b_1, c_1) + d(b_1, c_2) \geq 0$$

The total number of intersections between the vertical and horizontal lines is therefore:

$$NVH = \sum_x \sum_{orient} \sum_{b_1 \leftrightarrow b_2, c_1} IVH(b_1, b_2, c_1)$$

δ) Remote Connections and Bends:

For the so-called "remote" connections ($x_f - x_e \geq 2$), we create intermediary passage points (virtual components) and we refer back to the above case.

For terminals whose orientation is in contradiction with the direction of the connection, it is necessary to create a virtual point of passage for the bend (grouped together with the component) and to replace the terminal with this passage point in the above formula.

In this case, the respective order of the virtual passage points and of their associated terminals must be treated in the same manner as in the case of a connection between two terminals of a same component.

Grouping of Multiple Wire Cables

In the case of a multiple wire cable, it is preferable to group together the set of wires forming the corresponding cable. However, in certain cases, there are infeasibility risks. Of course, it is preferable that all of the terminals b of a set B of terminals remain joined side by side. However, in certain cases, as for example, in the case of multiple wire cables, we can tolerate that a terminal be inserted between two terminals of a same set B. We then speak, for example, of a "weak" grouping.

In such cases, we can then count the number of times when the external terminals come to be inserted inside of the B set, or let us assume $P_{blind}$ this number.

We will have:

$$P_{blind} = \sum_{b,b' \in B} \sum_{c \notin B, x_c = x_b} |d(y_b, y_c) - d(y_{b'}, y_c)|$$

In the cost function subject to optimization and concerning the number of intersections, this number can come to appear as a penalty.

In function of the different types of components, additional constraints can appear. In function of the types of components defined, these constraints shall be formulated into equations as shown further above.

Cost Function

We minimize $C_1 NHH + C_2 NVV + C_3 NVH + C_4 P_{blind}$

For example $C_1 = C_2 = C_3 = C_4 = 1$

Of course, other constraints can be implemented as well in the form of equations. This will naturally depend on the type of components capable of being represented. These various constraints will also be able to appear at the level of the cost function mentioned above.

It is also possible to simplify the system subject to optimization and to divide it into two subsystems.

In the pack of equations described in the paragraph on "representation of the arrangement of terminals", a pair of terminals (b, b') shall in fact be arranged by d(e, e'), e and e' being the differentiating "entities" for b and b'. As a result, there can be several pairs (b, b') for a same d(e, e'). It is sufficient to take just a single one to have the proper definitions for the d(e, e'). The procedure to be used is therefore the following:

1) Set up a table $T_{e, e'} = \{(b, b'): d(b, b') \equiv d(e, e')\}$ and a table $B_{b, b'} = \{(b, b'): d(d, d') \equiv d(e, e')\}$ 2) For each (e, e') in T, generate the pack of equations described in the paragraph on "representation of the arrangement of terminals" for one of the (b, b') of $T_{e, e'}$ (typically the first), as well as all of the other constraints.

3) Optimize the system obtained in this manner for the cost function. Thus, we have d(e, e')s that are correct, but altitudes that are "fuzzy".

4) Reread the d(e, e') obtained. For each (b, b') pair, generate the constraint $y_b \leq y_{b'} - 1$, if d(b, b') (i.e. $d(B_{e, e'})$) is equal to 0, or $y_b \geq y_{b'} + 1$ in the converse case.

5) Minimize the maximum of the $y_b$s: $\forall b, ym \geq y_b$ and the minimum: ym.

Third Operation

The optimization of the cost functions defined in the first and second operations has allowed us to produce a relative placement for all of the components to be represented on the wiring diagram. This third operation therefore has the objective of producing an absolute placement of the components in the vertical direction while observing the behavioral constraints corresponding to the types of components arranged on a same vertical line.

As for the horizontal placement of the components, we have provided a limited number of vertical lines on which are arranged the components. We therefore provide for placing the terminals at altitudes consisting of whole numbers from the grid pitch. To minimize the number of disconnects at the level of the linking lines, and therefore the number of bends as well, we minimize the number of cases where the terminals connected to one another are not located at the same altitude.

Constraints

For the components, as can be seen in FIG. 1, the corresponding text is placed beneath the component. We designate:

$txt_{ek}$ the altitude of the text to the component $e_k$, $top_{ek}$ the altitude of the peak of the component $e_k$, and $low_{ek}$ the lower altitude of the component $e_k$.

We then have the following constraints:

$txt_{ek} \geq top_{ek-1} + D_{min}$, $D_{min}$ being the minimal distance separating two components.

$low_{ek} = txt_{ek} + textheight(e_k)$

Positing between two terminals:

$\Delta_-(b_j) = \min(\Delta_-(b_j, 0), \Delta_-(b_j, 1))$ and $\Delta_+(b_j) = \max(\Delta_+(b_j, 0), \Delta_+(b_j, 1))$ and $y_{bj} + \Delta_-(b_j)$  Deltaterminal $\leq y_{b_{j-1}} + \Delta_+(b_{j-1})$Deltaterminal [+Delyaoutlet], if the component, or the box it represents, can be drawn out $y_{bj} = y_{b_{j-1}}$ +Deltaterminal [+Deltaoutlet], if not.

This depends on the type of component and is set by the behavioral specifications.

The term Deltaoutlet is only present if $b_{j-1}$ is the last terminal of the preceding outlet and $b_j$ is the first terminal of the outlet being processed. It is the distance between the outlets. It depends on the type of component.

For the first terminal of the component, we furthermore have:

$top_e = Y_{b_{last}} + C$, C being set by the specifications defining the component in function of its type.

The actual draft (or stretch, or spread) of the component is:

$$DRAFT_e = top_e - low_e - size(e)$$

The actual height used inside of the sheet s is:

$$HEIGHT_s = \max_{s.XMAXSHEET \leq k \leq (s+1)XMAXSHEET} \max_{X(e)=K} top_e$$

The $y_{b_i}$ are variable whole numbers.

If the component cannot be drawn out (or stretched), the first terminal of each outlet is declared to be whole, if not, they all are.

Optimization

The main criterion is the number of disconnects.

For each connection (b, b') of terminals positioned on two consecutive vertical lines and connected with one another, we define D(b, b') as a variable binary number by:

Maxheight.D(b, b')+$y_b$-$y_{b'}$ $\geq 0$
Maxheight.D(b, b')-$y_b$+$y_{b'}$ $\geq 0$ D(b, b') shall therefore be equal to 0, if there is no disconnect, and shall be equal to 1 otherwise.

A secondary criterion added after the fact is the length of the components which must not be drawn out (or stretched or elongated) indefinitely without any requirement.

The cost function is therefore:

$$W_1 \sum_{b \leftrightarrow b'} D(b, b') + W_2 \sum_{e\ draftable} DRAFT_e + W_3 \sum_s HEIGHT_s$$

$W_1$ is set, for example, to be the product of the number of components that are draftable by the number of sheets. $W_2$ takes on, for example, the value of the number of sheets and $W_3$ is equivalent to, for example, $$\frac{1}{Maxheight}.$$

Fourth Operation

The objective of this fourth and last operation is to now also produce the absolute placement of the components on the horizontal line. Here, we are more specifically interested in the routing of the cables and in the placement of the texts.

Routing of the Cables

Connections:

Let $(y_i, z_i)$ be the known altitudes of the terminals concerned in a connection $C_i$ on the vertical lines t and t+1.

Let $(y_j, z_j)$ be the known altitudes of the terminals concerned in a connection $C_j$ on the vertical lines t and t+1.

$P_i$ and $P_j$ are the abscissas of the passage points that we are seeking to determine.

The connections are sorted out by altitude: $y_i < y_j$, if i<j.

We examine all of the pairs $\{C_i, C_j\}$ with i<j.

The basic constraints are written up in the following manner:

$$P_i - P_j = Z_{ij}(2D_{ij}-1)(1+(M-1)U_{ij})$$

in which:

$D_{ij}=0$, if $P_i < P_j$, $D_{ij}=1$, if $P_i > P_j$ and indifferent if $P_i = P_j$.

$Z_{ij}=0$, if $P_i = P_j$, =1 if not.

M is the possible maximum for $|P_i - P_j|$ for all possible (i, j)s (it is a constant known in advance).

$U_{ij}$ is a continuous intermediary variable in [0, 1] that is used to implement the fact that $P_i - P_j$ is in [-M, -1], if $D_{ij}=0$, in [1, M], if $D_{ij}=1$, or $P_i = P_j$, if $Z_{ij}=0$.

The product of $Z_{ij}D_{ij}$ is implemented by:

$$Zd_{ij} \leq Z_{ij}$$

$$ZD_{ij} \leq D_{ij}$$

$$ZD_{ij} \geq Z_{ij}+D_{ij}-1$$

The same applies to $Z_{ij}U_{ij}$:

$$Zu_{ij} \leq Z_{ij}$$

$$ZU_{ij} \leq U_{ij}$$

$$ZU_{ij} \geq Z_{ij}+U_{ij}-1$$

The product of $Z_{ij}D_{ij}U_{ij}$ is then implemented by:

$$ZDU_{ij} \leq Z_{ij}$$

$$ZDU_{ij} \leq D_{ij}$$

$$ZDU_{ij} \leq U_{ij}$$

$$ZDU_{ij} \leq Z_{ij}+D_{ij}+U_{ij}-2$$

The overall constraint is then finally written up as:

$$P_i-P_j=-Z_{ij}+2ZD_{ij}-(M-1)ZU_{ij}+2(M-1)ZDU_{ij}$$

If $y_i = z_i$, there is no need for a point of passage. The connection $C_i$ is horizontal.

If $[y_i, z_i]$ does not intersect $[y_j, z_j]$, nothing needs to be done for the pair $\{C_i, C_j\}$.

If $[y_i, z_i]$ intersects $[y_j, z_j]$, then we must have $Z_{ij}=1$. The points of passage must be located at different points, otherwise the vertical lines would be stacked over one another and we would have a vertical overlap.

The same applies when $y_i = z_j$. There is a horizontal overlap if $P_i \leq P_j -1$, that is to say $D_{ij}=1$ and $Z_{ij}=1$.

Let us assume $OV_{ij}$ the variable indicating whether there is horizontal overlap or not for the connections $C_i$ and $C_j$.

$$OV_{ij} \geq D_{ij}+Z_{ij}-1.$$

The same applies when $y_j = z_i$. There is a horizontal overlap if $P_j \leq P_i - 1$, that is to say $D_{ij}=0$ and $Z_{ij}=1$.

$$OV_{ij} \geq (1-D_{ij})+Z_{ij}-1.$$

We also determine a variable $INT_{ij}$ to define the intersections between $C_i$ and $C_j$.

If the connections $C_i$ and $C_j$ go in different directions, that is to say, if:

$z_i > y_i$ and $z_j < y_j$ or $z_j < y_i$ and $z_j > y_j$, there will be an intersection in any case.

When the two connections $C_i$ and $C_j$ are rising, such as $y_i < y_j$, there will be an intersection if $D_{ij}=0$, or:

$$INT_{ij}=1-D_{ij}$$

To optimize the routing of the cables, we define a maximum point of passage called $P_{max}$, defined by:

$$\forall I\ P_{max} > P_i.$$

We then minimize the function:

$$K.\sum_{i<j}(OV_{ij}+INT_{ij})+P_{max},$$

K being a constant.

Verification for Possible Placement of Texts on the Cables

We verify, sheet by sheet, whether it is possible to place the texts that we wish to lay out on each sheet.

A first constraint consists therein that the space available to insert text must be greater than the length of the text that we wish to write out. This constraint can be written up in a mathematical form.

Constraints

These are done sheet by sheet. For one sheet:

We then assume that we have a set of texts $\{T_1 \ldots T_{N_{Txt}}\}$ and that for each text the possible sequence of placement ranges is:

$$P_t = \{(X_{t,1}, X'_{t,1}) \ldots (X_{t,nt}, X'_{t,nt})\}.$$

Furthermore, each text is composed of $m_t$ pieces of text whose length is $L_{t,1}, \ldots L_{t,mt}$. The $x_{i,j}$ are relative coordinates represented by whole numbers. In order to obtain an absolute placement, it will be necessary to associate a factor of $F_x$ to each interval $[x, x+1]$, possibly with $F_x=1$.

The actual length of the range $(X_{t,i}, X'_{t,i})$, that is to say the space available is then:

$$\sum_{x=X_{t,i}}^{X'_{t,i}-1} F_x$$

To place each piece m of text $T_t$, we will need $n_t$ binary variables $\tau_{t,m,i}$ which will be equal to 1 if the piece of text is on the i range, and equal to 0 if not.

The constraints for placing each piece of $T_t$ shall therefore be:

$$\forall t \forall m \in [1, m_t] = \sum_{i=1}^{n_t} \tau_{t,m,i} = 1$$

We indicate that the space available is greater than the space required to write out the desired text by:

$$\forall t \forall i \in [1, n_t] \sum_{x=X_{t,i}}^{X'_{t,i}-1} F_x \geq \sum_{m=1}^{m_t} \tau_{t,m,i}(L_{t,m} + \text{sparespace})$$

Sparespace is a predetermined constant, for example, that is in function of the size of the fonts used.

We also have:

$$\sum_{x=0}^{XMAXSHEET-1} F_x = \text{sheet length}$$

Depending on the type of text we wish to write out, and depending on the desired placement, other constraints will possibly have to be mentioned.

It is possible that the texts we wish to use are too large for the corresponding wiring diagram. In this case, it is not feasible: the problem cannot be resolved. In this case, the calculation can be taken up from the beginning by reducing the number of vertical lines on each sheet of drawing and by increasing the number of drawing sheets.

Positioning of the Texts on the Cables

The stage in question can be integrated to the fourth operation or, to the contrary, can be produced independently from the production process for the wiring diagram that is described here. We can project two software applications that are entirely distinct: one for producing the wiring diagram and the other for setting the texts into position on the cables.

The elementary objects of the sheet under consideration here are called wires. The totality of all of the wires on a sheet is designated by F and $f \in F$ signifies that f is a wire on a given sheet; "nbfil" is the total number of wires on the sheet. We consider that there a sequential order f<f' between the wires $f \in F$.

Certain wires can belong to structures that are more complex and are called cables. We designate as C the totality of cables on a sheet; nbcable is the total number of cables on the sheet. Each wire can belong to only one cable c and there possibly exist wires that belong to no cable whatsoever.

We differentiate between wires with an increasing x orientation, and wires with returns, which we designate as non-oriented. We use the notation $f \in o$ for an oriented wire, and $f \in no$ for a wire that is non-oriented.

We have two classes of cable available. The first is comprised of cables where we can fuse type 1 texts, the second covers groups of cables where we can simultaneously fuse type 1 and type 2 texts. We shall respectively note:

$c \in 1$ and $c \in 2$, the cables of class 1 and 2.

The Segments

To each wire is associated a set of segments.

nbseg(f) is the number of segments for wire f.

The segments constitute the spaces reserved for the texts. Each text associated to a wire must appear once and one time only in one of the segments of this wire. Since no text is to be placed on a vertical section of the wire, the segments constitute subintervals that are defined by the horizontal sections of each wire. The coordinates to the segments must be determined based on the results from the fourth operation. The construction is based on the graph for the wire which is described by the list of connections between the nodes for the beginning, the end and for the bend to which are added the nodes for crossing of the wire by other wires. The segments are thus comprised of the consecutive horizontal sections between the graph nodes while respecting the secure distance d to the other various wires.

For a segment s, we introduce the left terminal/s, the right terminal/s and the height altitude/s for which we geometrically identify s as being the straight horizontal line between points (x, y)=(left (s), high (s)) and (x, y)=(right (s), high (s)). We establish that:

$$0 \leq \text{left}(s) \leq \text{right}(s) \leq L$$

L being the length of the sheet.

We introduce the maximum terminals for each wire f $$\text{left}(f) := \min_{s \subset f} \text{left}(s), \quad \text{right}(f) := \max_{s \subset f} \text{right}(s)$$

For the abscissa x of a text $t \in f$, we must have left $(f) \leq x \leq$ right $(f)$.

We are assuming that the set of segments s on a wire f is ordered by a relation of s<s', which can be independent from the order in which the s'es appear on the wire f.

The Segments and Fusing of the Texts on the Cables

The segments s of a wire f belonging to a cable c must be classified according to two categories, depending on whether they permit or do not permit the fusion of the texts 1 (respectively 1 and 2). The segments s that permit fusion of the texts must necessarily be placed between the two sheaths belonging to a corresponding cable c.

We consider that the segments associated to the cables from class 2 that permit the fusion of type1 texts are the same as those which permit the fusion of type 1 and 2 texts.

The Types of Texts

On the wires of the block, we must place the texts, for which we distinguish ten different types. On each wire f, we must place nbtext (f) different texts therefore with nbtext (f)≦10.

By $t \in f$, we shall note the fact that a text of the t, $t \in \{1, \ldots, 10\}$ text type is to be placed on the wire f. Based on conventional rules, the numbering order for text types shall follow the preferential order, that is to say: type 1 is the number of the cable, type 2 is the type of gauge and type 3 is the color. For the other types of texts, we shall set in an arbitrary manner, but once and for all, the convention (for types 4, 5 etc. . . . ).

Structure of the Neighborhood Between the Wires

In order to prepare the cost function, we must have a structure available for defining the relation of vicinity between the wires. We can, for example, provide that the wires f and f', be neighbors, noted by $f \leftrightarrows f'$, if there exist segments $s \subset f$ and $s' \subset f'$ that are aligned in the following direction:

1) The intervals I:=(left (s), right (s)) and I':=(left (s'), (right (s')) have an intersection which is not empty.

2) No wire is to pass between the segments s and s'

3) At least one type of text t belonging to two wires, $t \in f$, $t \in f'$, enters the intersection I and I'

4) high (s)≠high (s'), which prevents us from having a wire be its own neighbor.

It is possible that a wire f has no neighbor, if in the wires f' that are adjacent to f, the segments aligned according to 1) and 2) do not allow sufficient space for the texts.

Decision Variables

There are two types of decision variables: the real variables and the binary variables. The Latin letters (x and e) designate real variables, and the Greek letters ($\lambda$, $\omega$, $\gamma$, $\alpha$) designate binary variables ($\lambda$, $\omega$, $\gamma$, $\alpha \in \{0, 1\}$).

Continuous Variables for Localization of Texts

For all wires f and for all types of texts t to be placed on said wire, we are introducing the variable:

x(f, t)=abscissa of the center of text t on the wire f.

Thus, we are therefore led to natural terminals:

$\forall j \in f, \forall t \in f,$ left $(j) \leq x(f, t) \leq$ right $(f)$.

Binary Variables Belonging to a Segment

For all wires f, and for all types of texts t, and for all segments s and f, we consider the binary variable to be:

$\lambda$(f, t, s)=1, if the abscissa of the text t is placed in the segment s of the wire, =0 if not.

The total number of these variables is:

$$\sum_{f \in F} nbtext(f).nbseg(f).$$

An estimate is provided for this number by:

nbfil. nbtext. nbseg. [nbfil=number of wire/s]

Binary Variables of Arrangement on the Wires

For all wires f and for all pairs of texts $t_1 < t_2$, we introduce the variable of arrangement:

$\omega$(f, $t_1$, $t_2$)=1, if the abscissa of the text $t_1$ is on the left of the text $t_2$, and =0 if not.

The introduction of the variable $\omega$(f, $t_1$, $t_2$) only under the condition that $t_1 < t_2$ allows us reduce the total number of binary variables for the problem of optimization.

Binary Variables Associated to Fusing the Texts on the Cable

For each cable, we introduce a binary variable:

$\gamma$(c, 1)=1, if we fuse type 1 texts on the wires of c, =0 if not.

A second binary variable $\gamma$(c, 2) shall be added for the cables c from class 2.

$\gamma$(c, 2)=1, if we simultaneously fuse texts 1 and 2 on the wires of c, =0 if not.

Binary Variables Associated to the Alignment of the Texts

For all pairs of wires (f, f') such as f<f' and such as f and f' are neighbors, $f \leftrightarrows f'$, and for all types of texts t entered on the list of the two wires, $t \in f$, $t \in f'$, we introduce a binary variable:

$\alpha$(f, f', t)=1, if the text is aligned between the wires f and f', =0 if not.

Constraints for the Problem of Optimization

Certain constraints are presented and formulated into equations in the following. Other constraints can be considered depending on the rules that are set.

$\alpha$) Guaranty the Presence of Texts on the Wires $$(CI) \forall f \in F \, \forall t \in f \sum_{s \subset f, t \subset s} \lambda(f, t, s) = 1$$

Whatever the wire f and whatever the type of text t associated to said wire, $t \in f$, the text must be positioned once and only once on one of the segments s of said wire f, for which it is known, a priori, that this text will enter.

$\beta$) Positioning of the Texts on a Segment

A second class (C2) of constraints has the form:

$\forall f \in F, \forall t \in f, \forall s \in f$ such that $t \subset s$ $$\text{left}(f)(1 - \lambda(f, t, s)) + \text{left}(s)\lambda(f, t, s) \leq x(f, t) - \frac{\text{long}(t)}{2}.$$

$$x(f, t) + \frac{\text{long}(t)}{2} \leq \text{right}(f)(1 - \lambda(f, t, s)) + \text{right}(s)\lambda(f, t, s).$$

The first of these two constraints signifies that if the text t of the wire f is situated in the segment s of said wire, the left side of the text t, (that is to say, x (f, t)–long (t)/2) must be to the right of the left side, (that is to say left (s)), of the segment itself, so that if t were not in this segment, the left side of the text would at least be to the right of the left side, (that is to say, left (f)) of the entire wire.

The second constraint expresses the same thing for the right sides of the segment and of the text.

$\gamma$) Relative Placement Between Different Texts of the Same Wire

For the relative placement of texts for a wire, we consider the constraints (C3):

$\forall f \in F, \forall s \subset f, \forall t, t' \in f,$ such that $t < t'$ and $t \subset s, t' \subset s$ (Do not enter this constraint if $f \in C, C \in 2, t = 1$ and $t' = 2$)

$\omega(f, t, t')\lambda(f, t, s)$ $$\lambda(f, t', s)\left[x(f, t) + \frac{\text{long}(t)}{2} + d - x(f, t') + \frac{\text{long}(t')}{2}\right] \leq 0$$

-continued $$(1 - \omega(f, t, t'))\lambda(f, t, s)$$

$$\lambda(f, t', s)\left[x(f, t') + \frac{\operatorname{long}(t')}{2} + d - x(f, t) + \frac{\operatorname{long}(t)}{2}\right] \leq 0$$

The first of these two constraints states that if the texts t and t' are in the same segment s of the wire f, and if t must be placed in front of t', then the right side of t must be to the left of the left side of the text t', all the while maintaining a secure distance d.

The constraint (C3) must be removed when c is a class 2 cable, $f \in c$, and t, $t' \in f$ are text 1 and text 2 types. In this case, we tend to fuse these two texts, and the constraint (C3) becomes contradictory. In this particular case, the constraint (C3) shall be replaced by a conditional constraint.

When introduced, the constraints (C3) are non-linear. We therefore subsequently use a device to render them linear. This device can be described as follows:

Let us assume binary variables $\beta_1, \ldots, \beta_r$, x a real variable (or discrete variable) with a known upper terminal, $x \leq c$. We then have the equivalence of:

1) $x \leq c_2$ on condition that $\beta_1 = 1, \ldots, B_r = 1$

2) $\beta_1 \ldots B_r(x - c_2) \leq 0$

3) $(x - c_2) \leq \left(r - \sum_{i=1}^{r} \beta i\right)|c_1 - c_2|$

With this device, which we will use again further below, the constraints (C3) are translated by:

$\forall f, \forall s \subset f, \forall t, t'$ such that $t < t'$ and $t \subset s, t' \subset s$, (Do not enter this constraint if $f \in c, C \in 2, t = 1$ and $t' = 2$)

$$\left(x(f, t) + \frac{\operatorname{long}(t)}{2}\right) + d - \left(x(f, t') - \frac{\operatorname{long}(t')}{2}\right) \leq$$

$$L(3 - \omega(f, t, t') - \lambda(f, t, s) - \lambda(f, t', s))$$

$$\left(x(f, t') + \frac{\operatorname{long}(t')}{2}\right) + d - \left(x(f, t) - \frac{\operatorname{long}(t)}{2}\right) \leq$$

$$L(2 + \omega(f, t, t')) - \lambda(f, t, s) - \lambda(f, t', s))$$

δ) Alignment of the Texts

Text alignment is managed by the α(f, f', t) variables. These variables come with the following constraints (C4):

∀f,f' ∈ F f<f' f ⇔ f'

α(f,f',t)(x(f,t)−x(f',t))=0

If t is aligned between f and f', then the abscissas must be the same in the two wires.

The linear form is established for (C4)

∀f,f' ∈ F f<f' f ⇔ f' x(f,t)−x(f',t)≤L(1−α(f,f',t))

x(f',t)−x(f,t)≤L(1−α(f,f',t))

Cost Function

As further above, in function of the constraints described here above, we determine the cost function which we optimize to obtain the placement of the texts.

Just as for the preceding four operations, the indicated variables and constraints are provided as exemplary embodiments to show how the equations can be established in a procedure in accordance with the invention. Other variables can be taken under consideration as well as other corresponding constraints. It is equally possible that some of the variables and constraints mentioned here prove to be useless for specific cases of embodiment.

Routes and Stitchings

Here, we are dealing with an application specific to the domain of aeronautics. The routes are presented in the form of arrows starting from a cable and to which texts are associated that provide information on this cable.

In a manner similar to that for the placement of texts, we are dealing with an application which, as shown in the following, can be integrated to the production process of a wiring diagram in accordance with the present invention, but this application can also be entirely dissociated from said process.

Introduction

The placement of the routes comes last. There is an astronomical number of possible routes. It is imperative to reduce the number of possibilities to a minimum. The stitchings of wires are advantageously treated at the same time as the routes.

Determination of Candidate Routes

A possible route is a vector comprised of six values <r, x, $y_1$, $y_2$, d, o> r is the route identifier.

x is the vertical line on which the route is located.

$y_1$ is the altitude of the text for the route (and of the start of the arrow).

$y_2$ is the altitude of the end of the arrow for the route.

d is the direction of the arrow (up/down).

o is the side on which the text for the arrow is located (left/right).

A possible stitching is a vector comprised of five values <r, x, $y_1$, $y_2$, d> r is the identifier for the stitching.

x is the vertical line on which the stitching is located.

$y_1$ is the altitude of the arrow's starting point.

The second line of stitching is below if the arrow is directed upward, and in the converse case, it is on top.

$y_2$ is the altitude of the end of the arrow for the stitching.

d is the direction of the arrow (up/down).

The stitching text is always centered on the arrow.

Preliminary Calculations

First of all, a matrix M corresponding to the diagram is calculated (an element by grid point) with:

$M_{x,y}$=AVAILABLE: point available for a text or for a routing or stitching arrow.

$M_{x,y}$=<r, f>: cable without text (wire f, route r). The point that is available to be vertically traversed by an arrow (note: includes the virtual points of passage).

$M_{x,y}$=UNAVAILABLE: point is not usable (inside of a component, of a text, of a vertical line, etc. . . . ).

Generation of Possible Routes

The determination of the routes is carried out, for example, route by route and vertical line by vertical line. The processing step for the most frequently used route is omitted because it will be the default route for the wiring diagram.

Analysis of the Vertical Lines

For each route R and for each vertical line X, we analyze the points of the vertical line, $L_R$ being the length of the route, in the following manner:

1) The points where the text for the route can possibly be placed:

$\forall x \in [X-L_R, X]$, $M_{x,y}$=AVAILABLE for a placement on the left or $\forall x \in [X, X+L_R]$, $M_{x,y}$=AVAILABLE for a placement on the right.

2) The AVAILABLE points that do not fulfill the conditions above: the text for the route cannot be placed here, but these points may be used for the route's arrow.

3) The UNAVAILABLE points. One is not permitted to place anything here and these are blocking points.

4) The points through which a cable having the route R passes (i.e., Mx, y=<R, *>.

5) The points through which a cable having a route other than R passes (i.e. $Mx_{,y}$=<R', *>,R'≠R).

Route Selection

The selection of the routes is done immediately after the analysis of the vertical lines and is also located inside of the double loop of the routes/vertical lines.

Being that the UNAVAILABLE points are absolute stopping points, we deal separately with the blocks of points situated between two such consecutive points and containing at least one cable of the route underway. We then regroup the consecutive black points into subgroups (it is the natural factorization of the contiguous cables having the same route).

Ascending candidate routes (direction=up): a route may only start from an AVAILABLE point and may not meet with another AVAILABLE point before having reached the first subgroup of the cables having the proper route. In fact, there are very few good reasons for distancing, to no purpose, a route from the cables to which it is associated.

One can draw up the parameters for the number of encounterable points AVAILABLE before the first subgroup. The above approach affects the value of 0 in this parameter, but it suppresses the options and in the extreme situation, it can render the problem infeasible for specific twisted cases.

For each starting point y fulfilling the above condition, we consider the subgroups of the cables $g_1$=<$ymin_1$, $ymax_1$>, ... ; $g_n$=<$ymin_n$, $ymax_n$> located after y and we generate a route for each possible cumulative factorization: (y, g1), (y, g1, g2), ..., (y, g1, g2), ..., (y, g1, g2, ... $g_n$). The $k^{nth}$ route will therefore have the parameters <R, X, y, $ymax_k$, up, o>, o being L (left) or R (right), depending on the case.

In a similar manner, we generate descending routes (direction=down) by traveling the vertical line in the inverse direction.

For each potential route generated in this manner, we create a binary variable IRS (R, X, y, y', d, o) which shall be equal to 1, if the route shall come to really exist and equal to 0 if not.

We calculate W (R, X, y, y', d, o) the number of points through which no cable passes that has the R route within the route (i.e. the number of points wasted) and T (R, X, y, y', d, o) the number of cables traversed and not having the R route.

The routes <R, X, y, y', d, o> having:

$$W(R, X, y, y', d, o) \geq \min_{X,y,y',d,o} W(R, X, y, y', d, o) + W_o$$

as well as the route having:

$$T(R, X, y, y', d, o) \geq \min_{X,y,y',d,o} T(R, X, y, y', d, o) + t_o$$

with for example $W_o$=8 and $t_o$=3 are, for example, ignored.

Let us assume $F_f$ a set of routes. <R, X, y, y', d, o> is included in all the Ff such that the route f is R and at least one of the cables from one of the subgroups of <R, X, y, y', d, o> is f. $F_f$ shall be the list of the possible routes containing the wire f.

Let us assume $G_{u,z}$ a set of routes. <R, X, y, y', d, o> is included in all of the $G_{x,z}$ such as z ∈ [y, y'] and in all of the $G_{u,y}$ such as u ∈ [$X-L_R$, X] for the routes on the left or u ∈ [X, $X+L_R$] for the routes on the right. $G_{u,z}$ shall therefore contain all of the possible routes using the grid point (u, z).

Generation and Selection of the Possible Stitchings

Quite similar to the routes, except that the AVAILABLE points are of the following type:

$$\forall X \in \left[X - \frac{L_p}{2}, X + \frac{L_p}{2}\right] M_{x,y} = \text{AVAILABLE}$$

and that the starting point of a stitching must have two consecutive AVAILABLE points.

For each potential route generated in this manner, we create a binary variable ISP (P, X, y, y', d) which shall be equal to 1, if the stitching shall come to really exist and equal to 0 if not.

The y designates the altitude of the internal line of the text for the stitching. We calculate WP (P, X, y, y', d) the number of points wasted and TP (P, X, y, y', d) the number of cables traversed and not being the one on which the stitching $P_o$ bears.

Just as previously, the stitchings <P, X, y, y', d> having:
WP(P, X, y, y', d)≧3
as well as the stitchings having:
TP (P, X, y, y', d)≧2
are, for example, ignored.

We also create sets of stitchings $GP_{u,z}$ and we include <P, X, y, y', d> in all of the $GP_{X,z}$ such as:
z ∈ [y+1, y'], if d=DOWN or z ∈ [y-1, y'], if d=UP
and in all of the $G_{u,y}$ such as u ∈ [$X-L_p/2$, $X+L_p/2$],
and if d=DOWN in all of the $G_{u,y+1}$ such as u ∈ [$X-L_p/2$, $X+L_p/2$],
and if d=UP in all of the $G_{u,y-1}$ such as u ∈ [$X-L_p/2$, $X+L_p/2$],
$GP_{u,z}$ shall therefore contain all of the possible stitchings using the grid point (u, z).

Constraints

Each and every wire must take its route at least one time:

$$\forall f \sum_{<R,X,y,y',d,o> \in F_f} ISR(R, X, y, y', d, o) \geq 1$$

and preferably not more than three times:

$$\forall f \sum_{<R,X,y,y',d,o> \in F_f} ISR(R, X, y, y', d, o) \leq 3$$

Each and every stitching must be present one time:

$$\forall P \sum_{<X,y,y',d>} ISP(P, X, y, y', d) = 1$$

The stitchings and the routes must not intersect:

$$\forall u, z \text{ such that } |G_{u,z}| + |GP_{u,z}| \geq 2$$

$$\sum_{<R,X,y,y',d,o> \in G_{u,z}} ISR(R, X, y, y', d, o) + \sum_{<P,X,y,y',d> \in GP_{u,z}} ISP(P, X, y, y', d) \leq 1$$

Optimization
Number of routes:

$$NROUTE = \sum_{<R,X,y,y',d,o>} ISR(R, X, y, y', d, o)$$

Number of cables traversed by the routes:

$$NTRAV_r = \sum_{\substack{<R,X,y,y',d,o> \\ T(R,X,y,y',d,o) \neq 0}} T(R, X, y, y', d, o) ISR(R, X, y, y', d, o)$$

Number of cables traversed by the stitchings:

$$NTRAV_p = \sum_{\substack{<P,X,y,y',d> \\ TP(P,X,y,y',d) \neq 0}} TP(P, X, y, y', d) ISP(P, X, y, y', d)$$

Wasted length:

$$LG = \sum_{\substack{<R,X,y,y',d,o> \\ W(R,X,y,y',d,o) \neq 0}} W(R, X, y, y', d, o) ISR(R, X, y, y', d, o) + \sum_{\substack{<P,X,y,y',d> \\ WP(P,X,y,y',d) \neq 0}} WP(P, X, y, y', d) ISP(P, X, y, y', d)$$

we minimize:

$$C_r \text{NROUTE} + C_{tr} \text{NTRAV}_r + C_{tp} p \text{NTRAV}_p + C_g \text{LG}$$

with for example: $C_r=4$, $C_{tr}=5$, $C_{tp}=2$, and $C_g=2$

Resolution

The above description indicates to the person skilled in the art how to formulate into an equation the technical problem which is set before him so as to resolve the problem with a computer while using techniques that are known for the resolution of equation systems and optimization systems. Several resolution techniques may be applied to linear equation systems such as those defined further above. We cite, for example, the "branch and bound" techniques (or in French, the so-called techniques of separation and evaluation) or the "branch and cut" technique (or in French, the so-called separation and cutting technique).

The solutions emerging from the resolution of said systems of equations are then forwarded to a translator which interprets the data it receives in order to then convert them into information which permits the production of a diagram. This information is then sent to a "terminal", for example to a monitor screen or to a printer, so that the user may visualize the diagram corresponding to the data which were introduced at the beginning.

The use of linear equations and the manner of resolving them in several operations allows for the resolution of technical problems which arise during the production of a wiring diagram that is done automatically. In fact, a computer could not solve in one single operation, not even for cable routes of "reasonable" size, all of the equations describing the constraints so as to produce the wiring diagram.

What is claimed as new and desired to be secured by Letters Patent of the United States is:

1. A process for generating a wiring diagram showing boxes, each representing a component used in a device subject to cabling, connecting lines, each representing a connection between two components, and terminals corresponding to a possible connection point between a connecting line and a box, said boxes being arranged along an axis of abscissas and an axis of ordinates, the process comprising the following steps:

inputting the components to be represented on said wiring diagram, each component being associated with constraints that were previously translated in linear equations, inputting the connections to be represented on said wiring diagram, generating a first system of equations, solving said first system of equations, optimizing, based on said solving of said first system, a relative positioning of the boxes on the axis of abscissas and an orientation of said boxes, generating a second system of equations, solving said second system of equations, optimizing, based on said solving of said second system, a relative placement of the boxes relative to the axis of ordinates and a relative positioning of the terminals of each box relative to said axis of ordinates, generating a third system of equations, solving said third system of equations, placing, in an absolute manner, based on said solving of said third system, the boxes relative to the axes of abscissas and ordinates, and optimizing, based on said solving of said third system, a routing of the connections.

2. A process in accordance with claim 1, wherein the connections to be represented are cables comprised of one or several wires, wherein a sheath is associated to a cable comprised of several wires, and wherein, during the relative positioning of the boxes on the axis of abscissas, the sheaths of the cables are relatively positioned in terms of the boxes to which they are connected.

3. A process in accordance with claim 1, wherein said third system of equations comprises two sub-systems, and said method comprises the steps of solving said two sub-systems of equations and of placing based on said solving of one of said sub-systems, in an absolute manner, the boxes in terms of the axis of ordinates, and placing, based on said solving of another of said sub-systems, in an absolute manner, the boxes in terms of the axis of abscissas and optimizing the routing of the connections based on said solving of said another of said sub-systems.

4. A process in accordance with claim 1, wherein said step of optimizing said routing of the connections comprises verifying the presence of a location on the connections configured to receive a text.

5. A process in accordance with claim 4, further comprising, after verifying the presence of a location for the text, a step of determining a positioning of the text on the connections by solving a system of equations.

6. A process in accordance with claim 1, wherein the linear equations exclusively use whole numbers.

7. A process in accordance with claim 1, further comprising the steps of defining at least one of said boxes by its size and its terminals and of associating said box with a graphic symbol and/or a text and/or a cable symbol associated to one or several terminals.

8. A process in accordance with claim 1, wherein said boxes indicate whether their width is variable, whether their height is variable, whether a sequential order of their terminals is modifiable, and whether the boxes are equipped with outlets.

9. A process in accordance with claim 1, wherein for the first system of equations, said boxes are assumed to be arranged on a predetermined number of vertical lines, and said first system of equations includes equations that translate constraints on the positioning of the boxes on said vertical lines.

10. A process in accordance with claim 1, wherein the first system of equations includes equations that evaluate a number of bends produced by the connecting lines linking the boxes and wherein said number is minimized.

11. A process in accordance with claim 1, wherein the second system of equations includes equations that translate constraints associated to grouping the terminals inside of the boxes.

12. A process in accordance with claim 1, wherein the second system of equations includes equations that evaluate a number of intersections produced between the connecting lines linking the boxes and wherein said number is minimized.

13. A process in accordance with claim 1, wherein said step of placing the boxes, in said absolute manner, along the axis of ordinates, comprises arranging the terminals of the boxes at altitudes which are all multiples of a predetermined grid pitch.

14. A process in accordance with claim 1, wherein said step of placing the boxes, in said absolute manner, along the axis of ordinates, comprises solving equations that evaluate a number of disconnects for the connecting lines, and minimizing said number of disconnects.

15. A process in accordance with claim 1, wherein said step of placing the boxes, in said absolute manner, along the axis of abscissas, comprises evaluating a number of overlaps in the connecting lines in a horizontal direction and in a vertical direction and minimizing said number of overlaps.

16. A process in accordance with claim 1, wherein said step of placing the boxes, in said absolute manner, along the axis of abscissas, comprises evaluating a number of intersections of the connections and minimizing said number of intersections.

17. A process in accordance claim 1, further comprising, for establishing the equations for the first, second and third systems of equations, defining real variables corresponding to a localization, and to a dimension, and defining binary variables that either assume a value of 0, or a value of 1, to indicate an element belonging to a set, to indicate the relative positioning of two elements, and wherein, the equations translate constraints proper to a type of wiring diagram produced.

18. A process in accordance with claim 1, further comprising introducing solutions originating from said solving steps into a translator to produce a diagram based on numerical data, and to produce said wiring diagram corresponding to numerical data obtained from said steps of solving said first, second and third systems of equations.

19. A computer program stored on an information storage medium, said computer program comprising instructions for performing a process in accordance with claim 1, when said program is loaded with and executed by an information system.

20. An information system, configured to perform a process in accordance with claim 1.

21. A data medium that is readable by an information system, said data medium comprising instructions from a computer program for performing a process in accordance with claim 1 when said computer program is loaded with and executed by an information system.

22. A process in accordance with claim 1, further comprising the step of printing said wiring diagram on a sheet of paper.

23. A process in accordance with claim 1, further comprising the step of displaying said wiring diagram on a screen.

24. A process in accordance with claim 1, wherein said device subject to cabling is an aircraft and said boxes represent aircraft electrical components.

* * * * *